(12) United States Patent
Walker et al.

(10) Patent No.: US 7,536,647 B2
(45) Date of Patent: May 19, 2009

(54) COMPUTER NETWORK HAVING CONTEXT SENSITIVE APPLICATIONS AND CONTROLS FORMING DYNAMIC USER INTERFACES ON LOCAL COMPUTER TERMINALS

(75) Inventors: Bradley K. Walker, Lincoln, NE (US); John D. Turnipseed, Lincoln, NE (US); Daniel J. Castagnoli, Lincoln, NE (US)

(73) Assignee: nanonation Incorporated, Lincoln, NE (US)

( * ) Notice: Subject to any disclaimer, the term of this patent is extended or adjusted under 35 U.S.C. 154(b) by 774 days.

(21) Appl. No.: 10/679,565

(22) Filed: Oct. 6, 2003

(65) Prior Publication Data

US 2004/0066397 A1 Apr. 8, 2004

Related U.S. Application Data

(62) Division of application No. 09/789,904, filed on Feb. 21, 2001, now Pat. No. 7,003,726.

(51) Int. Cl.
*G06F 3/00* (2006.01)

(52) U.S. Cl. ...................... 715/748

(58) Field of Classification Search ............ 715/744, 715/745, 760, 749, 748, 747, 765, 762, 513, 715/788; 709/203, 201
See application file for complete search history.

(56) References Cited

U.S. PATENT DOCUMENTS

| | | | |
|---|---|---|---|
| D347,628 S | 6/1994 | Ashmun et al. | D14/114 |
| D348,444 S | 7/1994 | Papademetriou | 235/145 A |
| 5,397,867 A | 3/1995 | Demeo | 200/5 A |
| D365,335 S | 12/1995 | Busch et al. | D14/106 |
| 5,620,371 A | 4/1997 | Blonder | 463/37 |
| 5,644,694 A | 7/1997 | Appleton | 395/174 |
| 5,646,821 A | 7/1997 | Sun | 361/683 |
| 5,692,212 A | 11/1997 | Roach | 395/806 |
| 5,761,071 A | 6/1998 | Bernstein et al. | 364/479.07 |
| 5,793,358 A | 8/1998 | Petkovic et al. | 345/168 |
| 5,935,243 A | 8/1999 | Hasebe et al. | 713/200 |
| 5,999,172 A | 12/1999 | Roach | 345/302 |
| 6,021,307 A | 2/2000 | Chan | 455/3.1 |
| 6,078,848 A | 6/2000 | Bernstein et al. | 700/237 |
| 6,101,324 A | 8/2000 | Connell et al. | 395/500.38 |
| 6,128,010 A | 10/2000 | Baxter et al. | 345/333 |

(Continued)

*Primary Examiner*—Stephen Hong
*Assistant Examiner*—Le Nguyen
(74) *Attorney, Agent, or Firm*—Sean P. Connolly, Esq.; Husch Blackwell Sanders LLP

(57) ABSTRACT

A computer network (20) having a plurality of terminals (22) and several network servers (26, 28, 30) are operative to develop context-sensitive, dynamic graphical user interfaces (32) which are programmed centrally by the network servers (26, 28, 30). XML packets (142, 144) are used to transfer information regarding the graphical user interfaces (32) between the terminals (22) and the network servers (26, 28, 30). The graphical user interface (32) is a layered multimedia environment having a background movie (248) played beneath substantially all of a plurality of screen application regions (220-230). A interactive control movie (240) is displayed in one of the screen application regions and includes control tabs (242) and dynamic button controls (244). A browser application (250) may be embedded in the background movie (248) as part of the layered media environment. Multiple applications can be operated in the selected screen application region, so each application is provided with a top tab (246) enabling users to bring the desired application to the top of the application panels.

9 Claims, 30 Drawing Sheets

Sweaters

U.S. PATENT DOCUMENTS

| | | | |
|---|---|---|---|
| 6,141,007 A | 10/2000 | Lebling | 345/339 |
| 6,157,379 A | 12/2000 | Singh | 345/333 |
| 6,178,510 B1 | 1/2001 | O'Connor et al. | 713/201 |
| 6,188,869 B1 | 2/2001 | Chan | 455/3.1 |
| 6,195,545 B1 | 2/2001 | Baker et al. | 455/414 |
| 6,198,738 B1 | 3/2001 | Chang et al. | 370/352 |
| 6,199,996 B1 | 3/2001 | Katrinecz, Jr. et al. | 362/85 |
| 6,216,141 B1 | 4/2001 | Straub | 707/513 |
| 6,217,183 B1 | 4/2001 | Shipman | 362/30 |
| 6,393,471 B1 * | 5/2002 | Kobata | 709/203 X |
| 6,405,221 B1 | 6/2002 | Levine | 707/501.1 |
| 6,411,960 B1 | 6/2002 | Fisher | 707/102 |
| 6,512,529 B1 | 1/2003 | Jannssen | 345/790 |
| 6,810,410 B1 * | 10/2004 | Durham | 709/203 |
| 6,973,478 B1 * | 12/2005 | Ketonen et al. | 709/203 |
| 2001/0051978 A1 * | 12/2001 | Allen et al. | 709/203 |
| 2002/0103821 A1 | 8/2002 | Nikilovska | 707/500.1 |
| 2002/0116534 A1 * | 8/2002 | Teeple | 707/513 X |

* cited by examiner

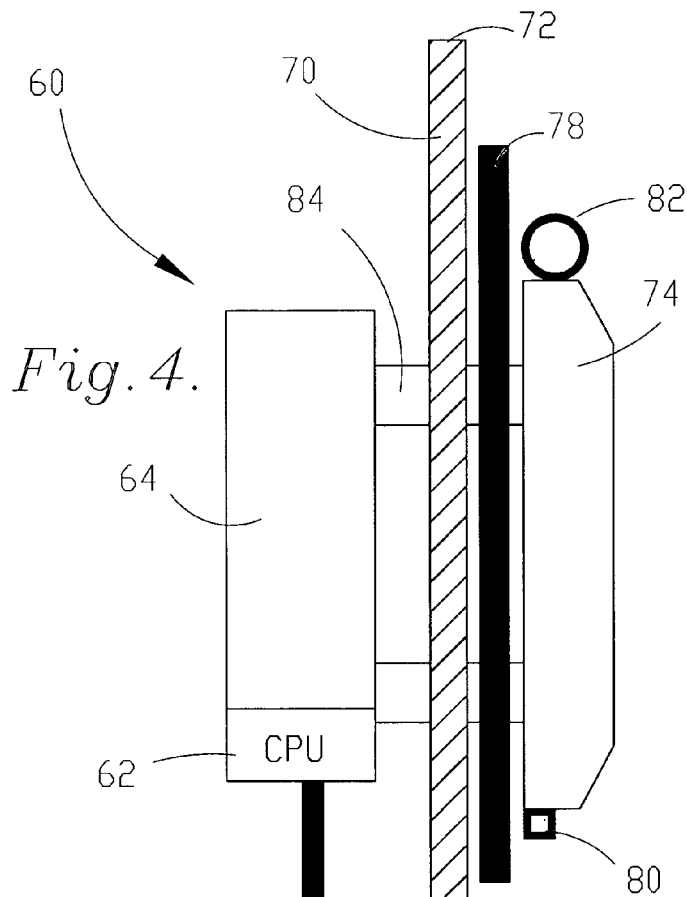
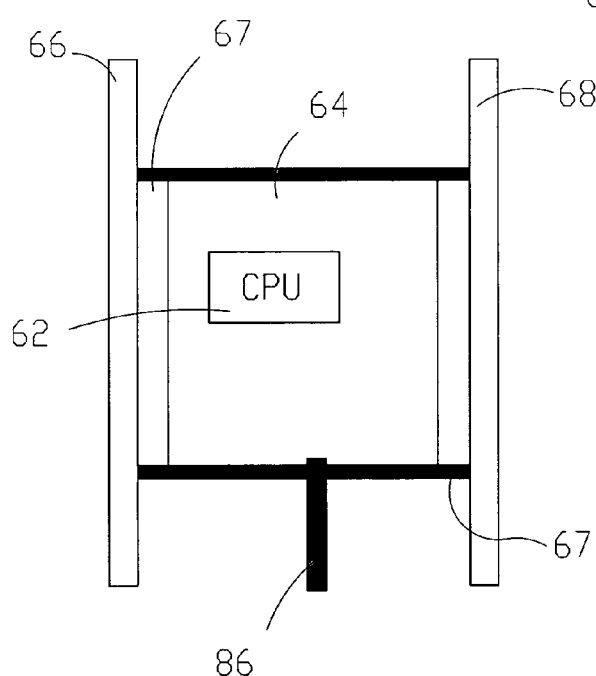

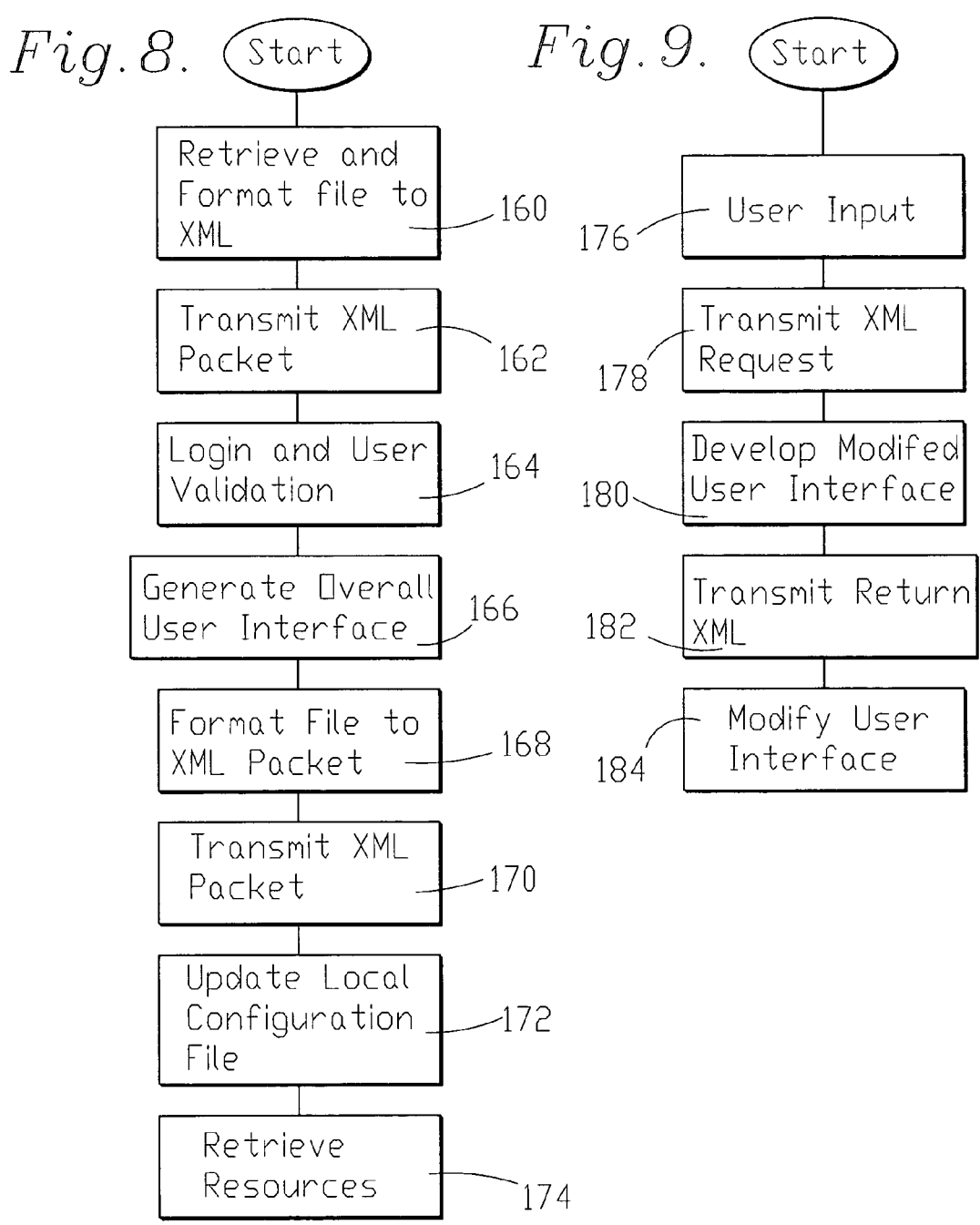

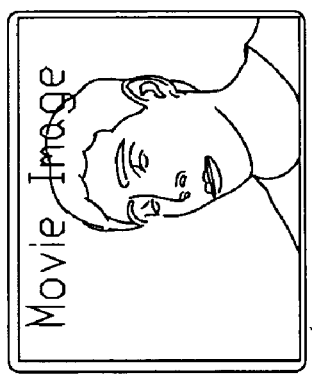
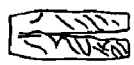
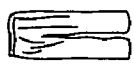
Fig. 12E.

COMPUTER NETWORK HAVING CONTEXT SENSITIVE APPLICATIONS AND CONTROLS FORMING DYNAMIC USER INTERFACES ON LOCAL COMPUTER TERMINALS

This application is a divisional application of and claims priority on previously filed U.S. application Ser. No. 09/789,904, filed Feb. 21, 2001, now U.S. Pat. No. 7,003,726.

COPYRIGHT NOTICE AND AUTHORIZATION

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates to computer networks providing adaptive and context sensitive interactive multimedia applications and controls. The applications and controls combine to form dynamic user interfaces on local computer terminals. More particularly, the invention relates to adaptive computer networks having centrally located servers receiving context and user information from local computer terminals to develop, utilizing extensible markup language (XML) packets, a context and user sensitive interface for the local computer terminals. The interfaces are created with centrally stored files, locally stored files, and/or Internet retrievable files thus providing centrally programmable user interfaces for local computer terminals.

BACKGROUND OF THE INVENTION

It is rumored that several decades ago, a Harvard professor opined that the world would never need more than three or four computers. In contrast to this legendary lack of foresight, an overwhelming majority of businesses and homes utilize personal computers and computer networks privately for word processing and computational and database support. However, computer use has not expanded as quickly into arenas where the general public uses them. Generally, computer systems have lacked the versatility, durability, and reparability for wide spread use by the general public.

Computers have been utilized in public facilities such as libraries for many years where individuals from the general public use the computers for very limited purposes and the presence of food and drink is restricted. Computers have also been used in restaurants, bars, and other venues to provide limited entertainment. By limiting the number and complexity of controls and enclosing the components of the computers in single housings, such as an inlay table or conventional standup arcade housing, these devices have proven sufficiently durable for the general public to use. However, it is generally necessary to remove the entire computer and housing from the venue in order to perform significant repairs.

Typically, entertainment is provided in the form of a jukebox, which only plays music, or it is provided in the form of a single game device, on which a user plays a single video game. Recently, some game devices have been enhanced to provide multiple game selections. The multiple player features of these video games, with the exception of recently introduced trivia games, are not capable of interactive play between two different players on different computers. Typically, each competing player takes turns or they play on a single computer having multiple sets of controls.

The recent proliferation of the Internet has led to a small increase of installations in libraries and other public forums such as coffee shops allowing individuals to conduct on-line research or browse while enjoying a cup of coffee. However, even with the dramatic increases in computer processor speed and memory capacity, which have significantly enhanced the computer's capability to support media applications such as videos, music, and interactive gaming, no computer network has provided sufficient versatility and adaptability for wide spread deployment in public venues such as bars, restaurants, hotels, and airports. While pay-per-view and opt-in satellite channels have started to deliver more content options, they have not utilized the web or created an avenue for easily uploading original content from client locations In these environments, customer interests and time variables for example, change dramatically from one venue to another and from one user to another. Current networks in these environments are custom designed for each specific venue and lack the ability to adapt to different customer interests and desires and generally lack the ability to provide more than one type of media at a time. Further the screen displays or graphical user interfaces (GUI's) for these applications are difficult to change. When a change is desired, the new GUI must be programmed and stored locally on the computer terminals of the network. Other solutions utilize Internet resources and link to customized web sites created and sponsored by the venue owner. These web-based implementations use standard browser technology utilizing the entire screen for the browser and thus fail to provide a true multimedia solution.

For years, single-purpose computer platforms or kiosk systems have been displaying information to public environments. Initially, these systems featured hard-coded presentation applications, which ran in a perpetual loop on the system. The user's options were limited to pre-programmed functions and/or paths through the content provided. More recently, some of these systems have included web-based components, but they have still failed to incorporate digital movie capabilities, allow for multiple application tasks within the user interface, or allow for the dynamic management of local resources.

BRIEF SUMMARY OF THE INVENTION

There is, therefore, provided the practice of the invention, a context-sensitive user interface generated from a central location for display and use on remote terminals. The user interface broadly includes a plurality of screen application regions and an interactive movie including control elements. The interactive movie is displayed in a selected one of the plurality of screen application regions.

In a preferred embodiment, the control elements comprise application tabs and control buttons. Different sets of control buttons are provided to control different applications including browsers and video. As the user selects different applications the control movie is changed to display a different set of control buttons.

In another aspect of the present invention, the user interface includes a plurality of screen application regions, and a background movie played beneath substantially all of the screen application regions. A browser operates in a selected one of the screen application regions and overlays and is embedded in the background movie.

In a preferred embodiment, the browser is controlled by the interactive control movie. Further, it is possible to open additional applications in the selected one of the screen application regions. Identification tabs are displayed for the browser and other application panels for easy access by the user. Preferably, the identification tabs are provided by an interactive movie.

In still another aspect of present invention a dynamic user interface is provided having a plurality of screen application regions and multiple applications operating in a selected one of the screen application regions. In a preferred embodiment identification tabs are provided for each of the application panels. Preferably, at least one of the applications is a browser.

Each of the above-described aspects of the user interface are utilized in methods for providing, generating, and controlling the user interface. Further, the dynamic user interface and methods operate on computer networks including a plurality of remote terminals in operative communication with a central server. The remote terminals include displays operative to display the above-described aspects of the user interface.

In a still further aspect of the present invention, a computer installation is provided for installing the remote terminals in a wall. The installation comprises at least one wall frame member and a wall cover member attached to the wall frame member. A computer housing, which supports a central processing unit, is mounted on the wall frame member adjacent to an inner side of the wall cover member. A computer display in operative communication with the central processing unit is positioned adjacent to an outer side of the wall cover member, and an input device is located for access by a user. The input device is also in operative communication with the central processing unit.

In a still further aspect of the present invention, a method is provided for distributing income from advertisers and from transmission of a media event. The method includes a network operator receiving income from advertisers and from customers viewing the media event at various venues. The network operator retains an operator portion of the income and distributes a promotor portion of the income to the promotor. Further, the network operator distributes a venue portion of the income to the owner of the venue.

Accordingly, it is an objective of the present invention to provide an improved computer network with an improved user interface for controlling multiple media applications.

BRIEF DESCRIPTION OF THE DRAWINGS

These and other inventive features, advantages, and objects will appear from the following Detailed Description when considered in connection with the accompanying drawings in which similar reference characters denote similar elements throughout the several views and wherein:

FIG. 4 is a side view and partial cross section of an alternate computer terminal installation according to the present invention;

FIG. 5 is a fragmentary rear view of the computer terminal installation in FIG. 4;

FIG. 8 is a block diagram illustrating the steps for creation of an overall user interface according to the present invention;

FIG. 9 is a block diagram illustrating the steps and updating or modifying the overall user interface;

FIG. 12E is an elevational view of a user interface illustrating a specific step in a user commercial session;

DETAILED DESCRIPTION

Figure 1:
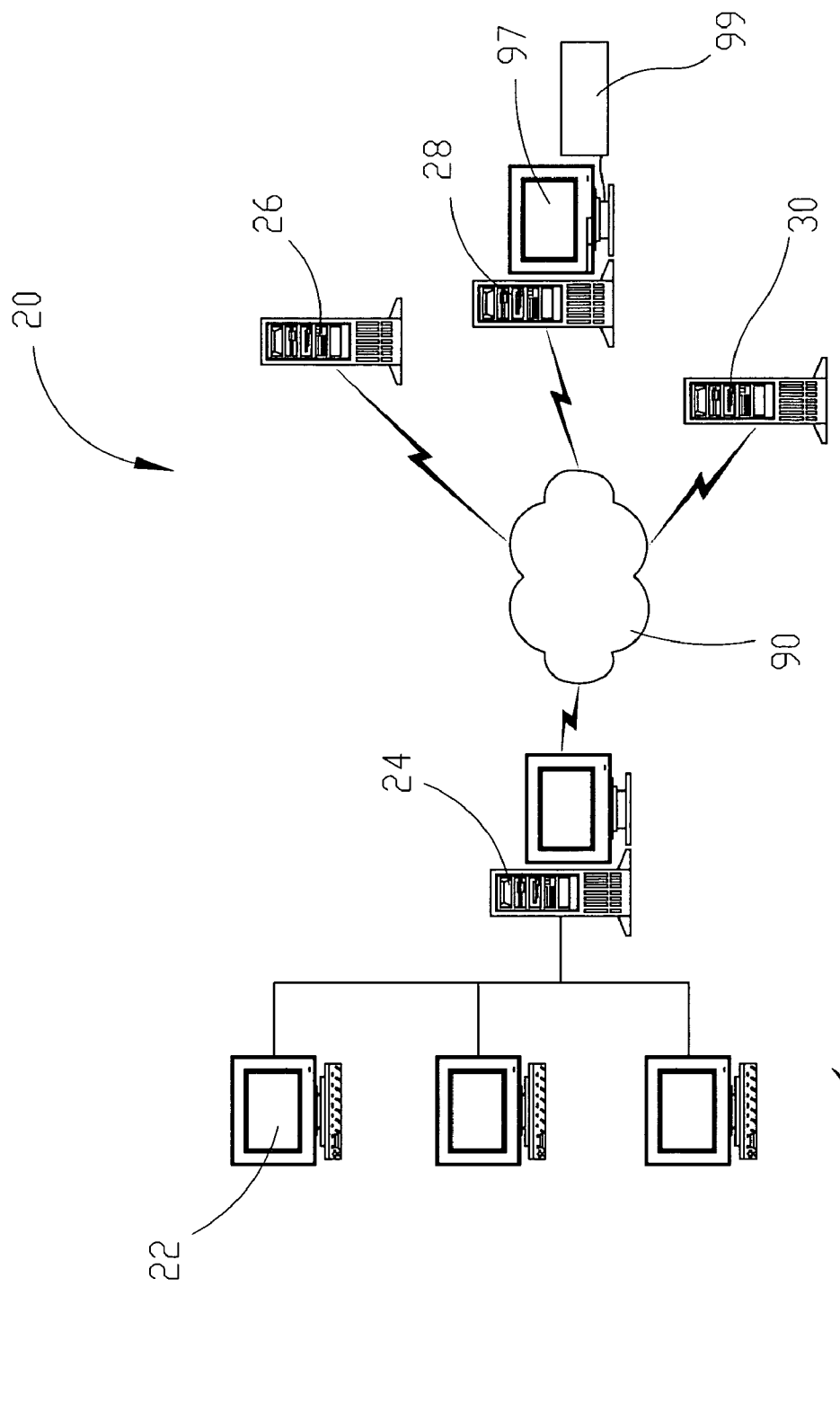
FIG. 1 is a schematic illustration of a computer network according to the present invention.

Referring to the drawings in greater detail, FIG. 1 shows a computer network 20 constructed in accordance with a preferred embodiment of the present invention. The computer network 20 broadly includes a local installation 21 having a plurality of local terminals 22 and an optional local server 24. The computer network also includes several central servers 26, 28, 30. The local terminals 22 and the local server 24 reside at the physical location of a forum such as a sports bar. As illustrated in the schematic block diagrams of FIGS. 7 and 10, the computer network 20 is operative to provide a dynamic, centrally programmed, GUI (graphical user interface) 32 shown in FIG. 2. The computer network 20 also enables the use of a unique income distribution model 34 illustrated in FIG. 15.

Figure 2:
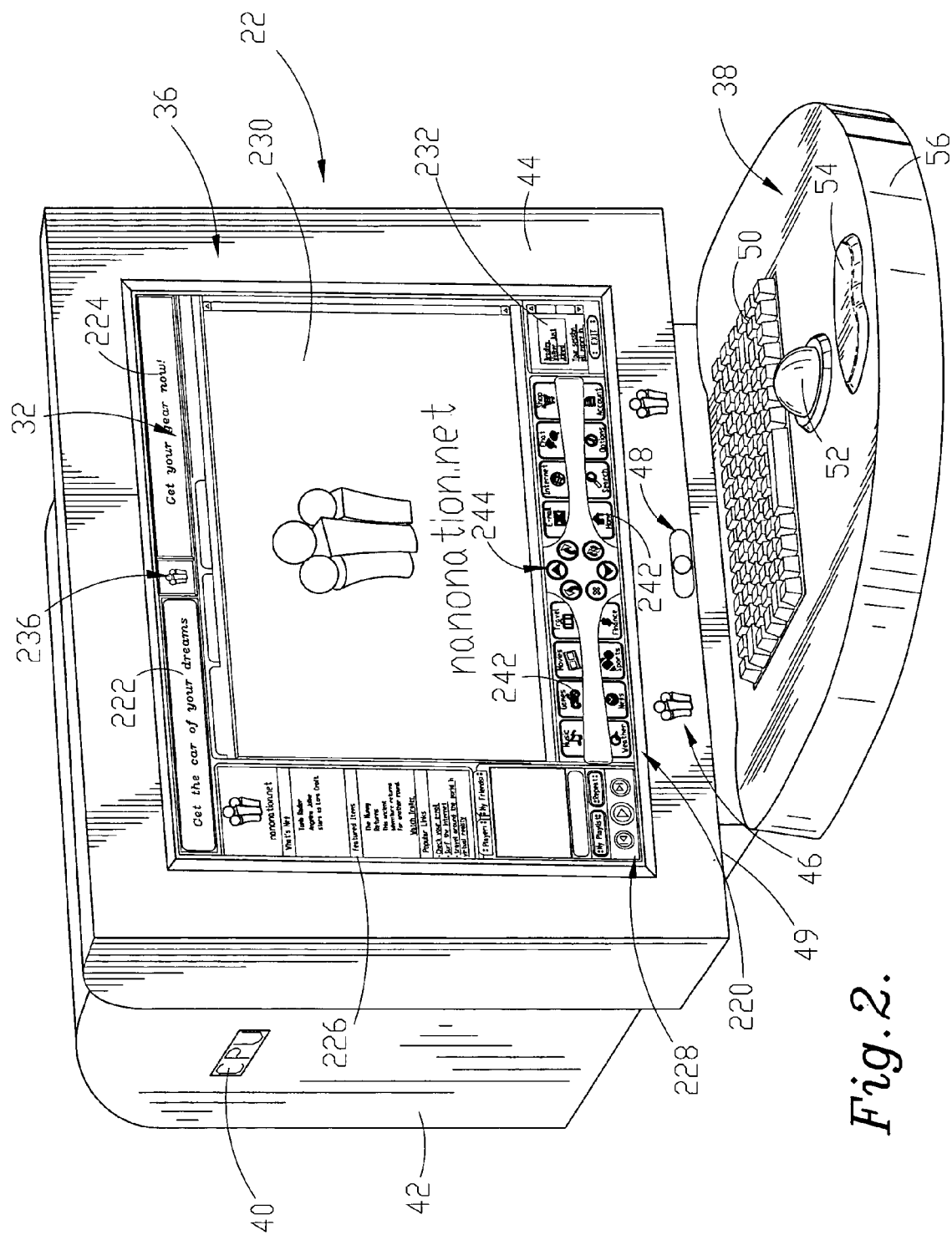
FIG. 2 is a perspective view of a computer terminal provided in the computer network of FIG. 1.

Referring to FIG. 2, the local terminals 22 each preferably includes a display 36, input device 38, and a schematically illustrated CPU (central processing unit) 40 together with a CPU housing 42 and necessary OS (operating system) software. Thus, each terminal 22 is preferably a complete computer system. The specific platform of the terminals is not critical, can change from terminal to terminal, and may include Windows or Macintosh platforms, for example. The display 36 is in operative communication with the CPU 40 for control by the CPU 40, and the display 36 includes a frame 44, which supports speakers within speaker openings 46 and a centrally located and recessed headphone jack 48. While the position of the speakers and sound jack may vary, the speakers with their accompanying speaker openings 46 and the sound jack 48 are preferably positioned adjacent the bottom edge 49 of the display frame 44. Generally the speakers will be positioned at the base of the monitor, but they may be placed in the CPU housing 42 in some configurations. The sound jack 48 can also be positioned on the input device, preferably on the right side of the keyboard tray in the embodiment shown. The display 36 can be a high resolution CRT (cathode ray tube) monitor such as a SVGA (super video graphics array) capable monitor. Preferably, an LCD (liquid crystal display) monitor or an FTM (flat technology monitor) having a digital connection is utilized.

The input device 38 preferably includes multiple input components. In the embodiment shown, the input device 38 utilizes a moisture and impact resistant keyboard 50 having illuminated or back lit keys. The illuminated keys permit use in dimly lit areas such as bar room environments, and the durability of the keyboard resists the liquid spills and bumps that are expected in such venues. A second component of the input device comprises a relative pointer such as the illustrated track ball 52 and thumb click button 54. Both the track ball 52 and click button 54 are preferably sealed to resist moisture penetration. Alternatively, a mouse is utilized in place of the track ball 52 or an absolute pointer such as a touch screen is provided. The track ball 52 and click button 54 are preferred because they are held by an input device housing 56 which also holds the keyboard 50. Including all components of the input device 38 in the single input device housing 56 minimizes the likelihood of damage and theft. In one embodiment, the input device is in remote communication, preferably through infrared signals, with the CPU 40.

The CPU 40 is held inside the CPU housing 42 along with other necessary components of the terminal, for example, SCSI (small computer system interface) or IDE controller, storage (hard drive), graphics card, communication device/network connection, memory (at least 128M RAM), power supply, and cooling device. The microprocessor should be sufficiently fast for network operations and preferably 700 MHz or greater, while processors operating at approximately 450 MHz are satisfactory. Similarly, the other components are desirably advanced to operate graphic intensive applications and games. In one embodiment, the CPU 40 and other computer system components are provided in a module. The module can be quickly removed from the CPU housing 42 and replaced with another module. This minimizes down time for malfunctioning terminals, and permits maintenance of malfunction CPU's at central repair locations.

Figure 3:
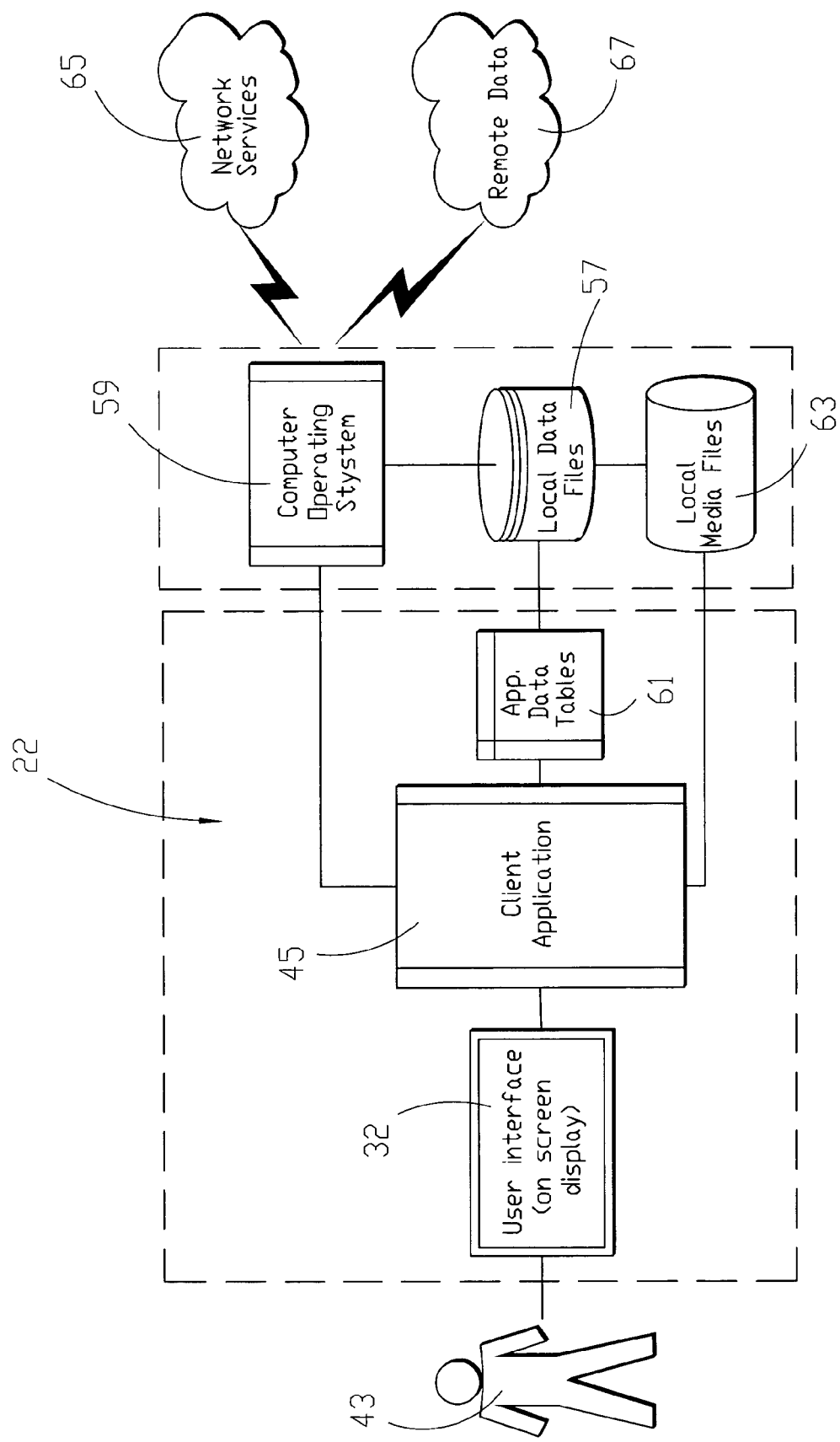
FIG. 3 is a schematic block diagram illustrating software and data components of the computer terminal in FIG. 2.

Referring to FIG. 3, users 43 enter information at the terminals 22 using the input devices 38 (FIG. 2). The full-screen GUI 32 developed, as described below, with the client application software 45 facilitates entry of the user information. Users 43 enter, for example, payment information, personal information such as name, gender, and age, and personal preferences such as hobbies, favorite athletic teams, and their alma mater. If desired, the terminals can be provided with magnetic card readers for credit card or prepaid card payment. This user information is stored by the database server 30, described in greater detail below, and may also be stored in local data files 57. During terminal 22 operation, the client application logic 45 utilizes an OS (operating system) 59. The OS is a software component operable to manage network calls, onscreen draw commands, local file storage, and access to physical devices controlled by the CPU. The OS also manages all external applications operating on the same CPU and all hardware connected to the CPU. Thus, the OS runs and manages operation of the client application software 45 which in turn manages and draw resources from data tables 61, which are cached in memory and contain, for example, user information, the local data files 57, and local media files 63. To further enable development of the GUI 32, the client application software 45 is also operable to draw on resources from the network services 65, the network servers 26, 28, 30 (FIG. 1) and other remote data 67 from, for example, Internet sites as managed by the network servers. Further, the client application software 45 inhibits user 43 access to the file systems and OS 59.

Referring to FIGS. 4 and 5, an alternate wall mounted terminal 60 utilizes a unique computer installation to save space. The wall-mounted terminal 60 includes a CPU 62 supported by and preferably held inside a CPU housing 64. The CPU housing 64 is mounted on at least one substantially rigid wall frame member 66 but preferably on two wall frame members 66, 68 with mounting brackets 67. Preferably, the housing 64 is mounted between two wall frame members 66, 68 and adjacent an inner side 70 of a substantially constant wall cover member 72 attached to the wall frame members 66, 68, so that the inner side 70 abuts the wall frame members 66, 68. A digital computer display 74 is positioned adjacent an outer side 76 of the wall cover member 72 along with speakers 78, which can be integrated flat speakers mounted in a frame surrounding the display 74. The display is in operative communication with the CPU for control by the CPU 62. Other devices, such as an infrared sensor 80 or camera 82 are mounted on the frame or the display adjacent the outer side 76 of the wall cover member 72. The infrared sensor 80 establishes operative remote communication between the input device 38, which is made accessible to the user, and the CPU, and users utilize the camera 82 for live video communication. If desired, a second or rear wall cover is attached over the CPU housing 64 and is provided with an access panel.

The display 74 can be mounted to a selected one of the wall cover member 72, the wall frame members 66, 68, and/or the CPU housing 64. In a preferred embodiment, the display 74 is mounted to the CPU housing utilizing at least one hollow tube 84 passing through the wall cover member 72 and used to convey communication lines and power supply lines between the CPU 62 and the display 74 and speakers 78. The CPU 62 and other components of the local terminal computer system are supplied with power from a power supply 86 inside the wall cover member 72. Again, the CPU 62 and other components can be provided in an interchangeable module.

Referring again to FIG. 1, the local server 24 is in operative communication with the terminals 22 through network connections, which may be wired or wireless. The local server 24, which is not included in all local network installations, assists in system and network operations including file transfers, cache management, application service, and media access allocation. The local server 24 or the terminals 22 if there is no local server, preferably connect to the central servers 26, 28, 30 through the Internet 90, and the Internet connection is established through commercially available telecommunication services. While an Internet connection is preferred, it is understood that the computer network could be implemented, for example, over a LAN (local area network), WAN (wide area network), intranet, or VPN (virtual private network).

The central servers 26, 28, 30 include a web server 26, business server 28, and database server 30. The hardware supporting the web server 26 also supports a SOAP (simple object access protocol) server. Each of the servers comprises a commercial server product designed, configured, and/or programmed to perform the desired functions. The web server 26 preferably utilizes Apache Tomcat. The business server 28 preferably utilizes WebObjects, and the database server 30 preferably utilizes Oracle. The three illustrated components of this server-side of the network 20 can be physically implemented in one or more hardware configurations and can reside together or at separate locations. They preferably communicate with each other through LAN or WAN connections depending on the physical location of each component.

The web server 26 manages and receives incoming requests from the local terminals 22 or local servers 24 and routes those requests to the appropriate server. The web server 26 is also operative to retrieve web pages of ASP's (application service providers) 96 (FIG. 6) or other URL's (uniform resource locators) 98 (FIG. 6) as appropriate for received requests.

Requests for business functions, such as statistical analysis, revenue calculations, and database queries for user data, are routed to the SOAP server, which runs in conjunction with the web server 26. The SOAP server manages access to the business 28 and database 30 servers. The business server 28 is operable to perform revenue calculations, statistical analysis, and other GUI operations, described more fully below, and provides response messages and objects to other network components. To enable access to business information and modification of business rules, the business server 28 is preferably provided with an input device such as a key board and output devices such as a monitor 97 and printer 99. In performing its operations, the business server 28 accesses the database server 30, which stores user information and media information. The DBMS (database management system) operating the database server 30 preferably supports multimedia BLOB's (binary large object). The client-side local server 24, when provided, provides the web server, SOAP server, business server, and database server functions at the local level, but the local server 24 is specifically configured for local use and cooperative processing with the central servers 26, 28, 30 and the local terminals 22.

Figure 6:
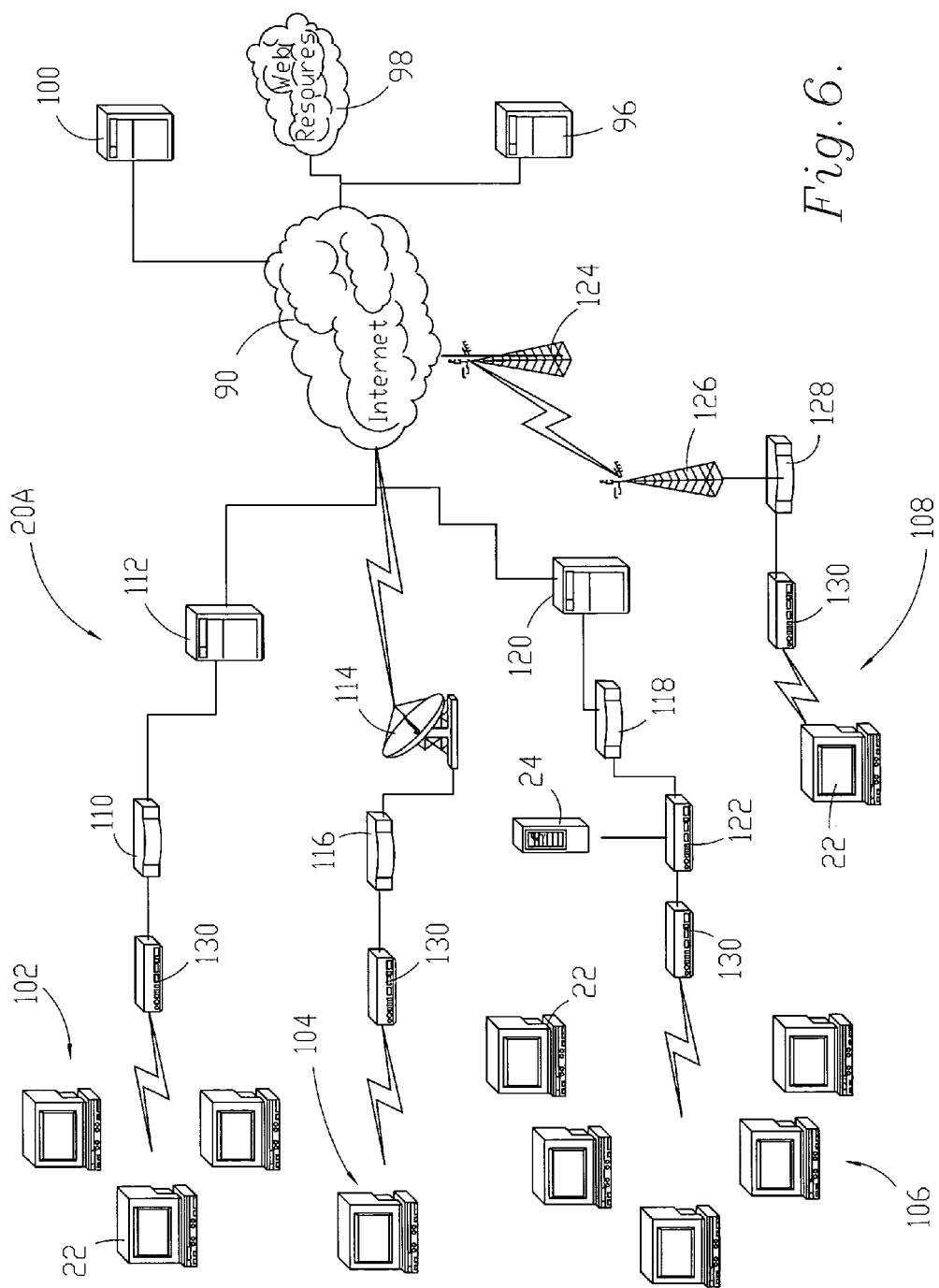
FIG. 6 is a schematic device diagram illustrating the various communication means for the computer network according to the present invention.

As illustrated in FIG. 6, the specific nature of the connections of the computer network 20A between the server-side servers, collectively 100, and numerous local installations 102, 104, 106, 108 of terminals 22 can be and is accomplished through many know communications means and is adaptable for connection with future improvements in telecommunications. The first local installation 102 utilizes a DSL (digital subscriber line) router 110 in operative communication with an ISP 112 (Internet service provider) or telephone company having DSL installations. It should be understood that other forms of broad bandwidth communications such as ADSL, VDSL, ISDN, and others can be used. The second local installation 104 utilizes a satellite 114 and router 116. The third installation 106 also uses a DSL router 118, but the router 118 is in operative communication with an infrastructure provider 120. Further, the third installation 106 is provided with a local server 24 and a switching hub 122 for joining various components of the LAN. The fourth installation 108 utilizes a wireless provider 124, a wireless receiver 126, and router 128 to provide a mobile connection especially useful for marketing demonstrations and special events at temporary locations. Each of the installations 102-108 utilizes a wireless base station 130 for communication with the terminals 22.

Figure 7:
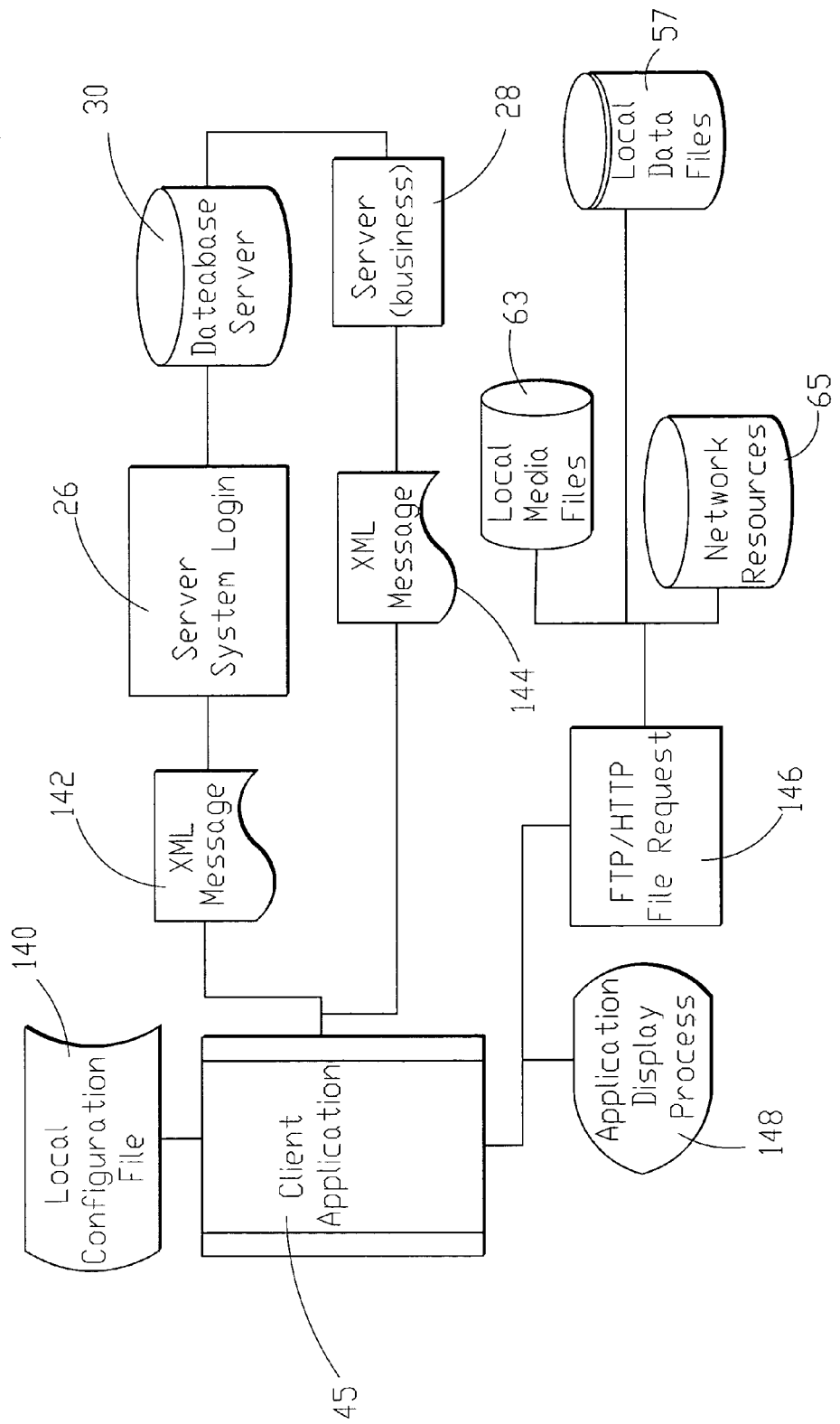
FIG. 7 is a schematic block diagram illustrating various hardware, software, and data components utilized in the computer network of FIG. 1.

In the operation of the above described computer network 20A illustrated in FIGS. 7 and 8, a unique local configuration file 140 containing context information for each terminal is retrieved and formatted at step 160 into an XML request packet or message 142 and transmitted 162 over a computer readable transmission medium, as described in connection with FIG. 6, to the web server 26. The context information includes, sponsor information, the location and owner of the terminal, and, for example, special event information for the location. The local configuration file 140 also contains an initial overall configuration for the GUI 32. The web server 26 performs system login 164 at system startup. The XML request and return packets for system login contain the content information for the terminal logging in. The user 43 is then validated, also illustrated in step 164. As users login to the system, the user validation step is repeated for each user with XML request and return packets containing content and user information. User validation also includes retrieval of information from the database server 30. The database server 30 returns user data to the business server 28, which generates, based on operator input rules and programming, the overall user interface at step 166. The business server 28 then formats, at step 168, the overall user interface into a return XML packet or message 144 and routes the return packet 144 to the web server 26 for transmission 170 to the requesting client application 45. The client application 45 then reads the return XML packet 144 and implements the instructions therein for the application display process 148.

The return XML packet 144 can also contain instructions for updating the local configuration file 140. If update instructions are included, the client application 45 updates, for example, the user information and initial overall interface stored in the local configuration file 140 at step 172. The return XML packet may also contain instructions for updating local media 63 and data 57 files. Thus, the computer network 20 provides a centrally programmed GUI 32, so that when changes are desired, they are programmed at the central business server 28 level and implemented across the entire network 20 as various terminals 22 are activated.

To complete the user interface 32 (FIG. 2), the client application 45 sends out FTP (file transfer protocol) commands or file requests 146 for local and remote media files 63 and data files 57 and HTTP (hypertext transfer protocol) requests for network resources 65. These commands 146 are sent in response to user action or in response to instructions in the return XML packet 144 to obtain these resources. As the client application 45 retrieves resources such as web pages and media players at step 174, it begins the display process 148. The display process 148 then continues throughout the user session to adapt the display interface 32 as the user 43 requests different applications.

Figure 10:
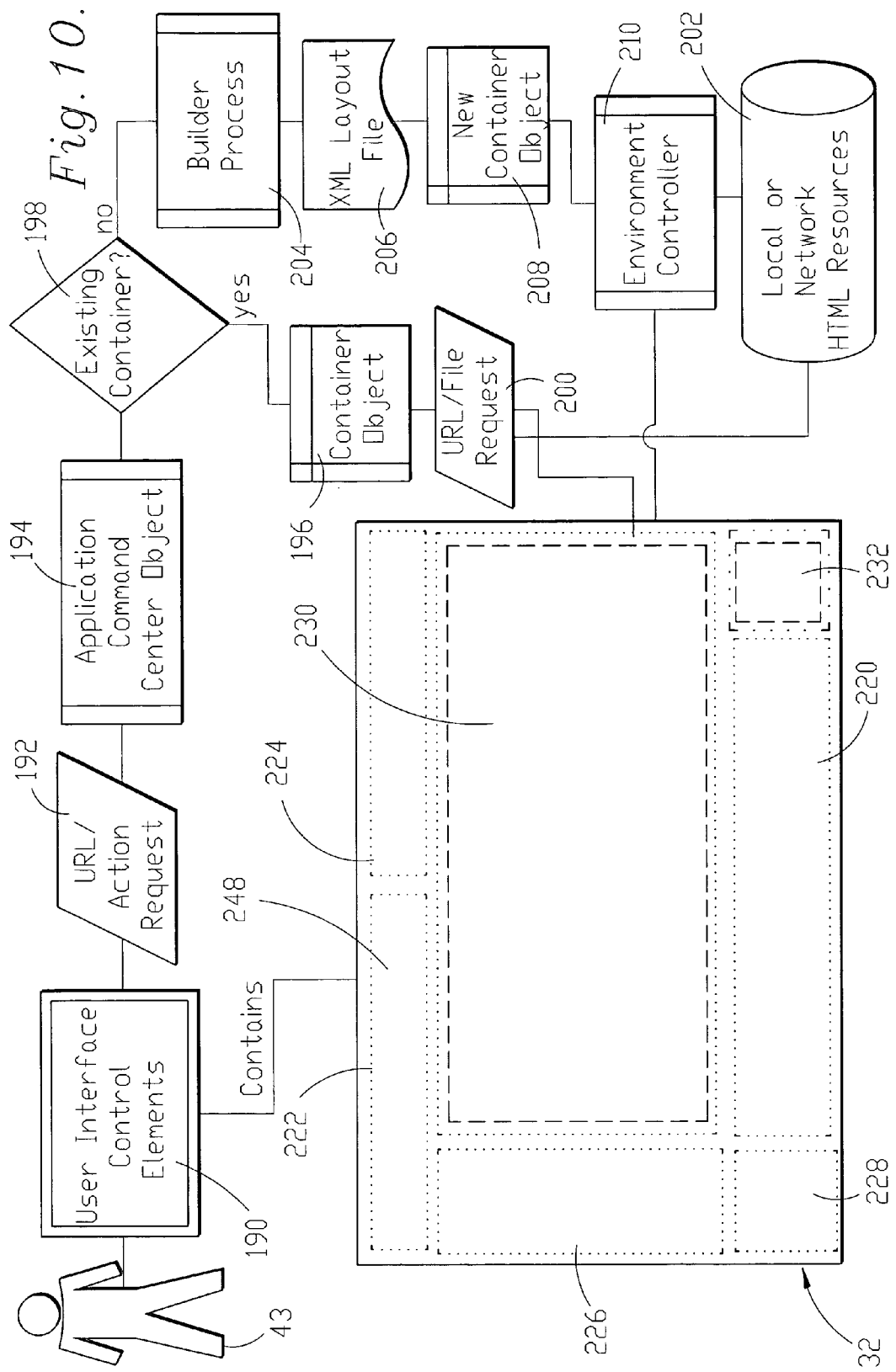
FIG. 10 is a schematic block diagram illustrating software, hardware, and data components of the computer network of FIG. 1.

Referring additionally to FIGS. 9 and 10, when, at step 176, a user activates the interface control elements 190 to input a request for a different application or new content for a current application, the client application 45 optionally, at step 178, formats and transmits a request to the pertinent application. The request is embedded in a URL, which triggers a request that is then routed to the network web server 26. The business server 28 then develops, if required by the programmed business rules, a modified or updated overall user interface at step 180. The return XML packet is encoded and transmitted 182 back to the requesting client application, which reads the return XML packet and modifies 184 or updates the user interface, local media files, and local data files as instructed.

Whenever the user 43 activates one of the interface control elements 190, the control element issues a URL or application action request 192, which is read by a container object command center 194. The container object command center 194 is part of the client application software 45 and is operative to control container objects 196, which correspond to screen application regions described below. If, for example, the user has requested a browser application, the command center determines at decision step 198 if a browser container object exists among the multiple container objects already in the system. If the browser container object already exits, the command center 194 targets the existing container object 196, and it is used to display the browser application. The URL request 200 retrieves the identified web page for the browser. If the original application was something other than a browser, a file request may gather the local or network HTML resources 202 for display.

If there is not a browser container object among the exiting container objects, a container object builder 204, which is itself an object residing on the client application software 45, reads the appropriate XML layout file 206 from the database server 30. The client application software 45 then creates the new browser container object 208. An environment controller 210 controls the layered media environment and gathers the local and/or network media files 202 to populate the requested browser container object. Once operating, the browser container object is capable of interpreting, rendering, and allowing user interaction with HTML and XML resources. Thus, the computer network 20 provides a user interface 32, which changes and updates on the fly in response to user input.

Referring to FIGS. 2, 3, 7, and 10, the overall user interface 32 includes at least one but preferably a plurality of screen application regions corresponding to the container objects 208 in the software. Preferably, the screen application regions include a control region 220, a pair of advertiser link regions 222, 224, a features and favorites links region 226, an audio player region 228, and a primary application region 230. The screen applications regions 220-230 are generally rectangular. A status area 232 provides information and event notices, such as new mail and/or buddy logged on, to the user. In the embodiment of the screen shown in FIG. 2, the interface also includes an application status region 236, displaying a throbber, which indicates the status of the application. The screen application regions 220-232 are defined by the client application 45 pursuant to instruction received from the network business server 28. Specifically, the client application 45 creates a global grid consisting of the one or more screen application regions. Each screen application region is defined by the configuration instructions to contain properties and functions applicable to the media type to be displayed within it. The client application software is able to support and the business server contains XML layout files for QuickTime, HTML, Shockwave, and other media formats. However, this capability can be extended as new media types are developed and built into XML configuration.

Referring again to FIG. 2, the client application 45 (FIG. 3) places one or more navigation control 240 in the control region 220. The navigation control 240 comprises an interactive movie, preferably an Apple, QuickTime movie, having control elements, graphic elements, and embedded commands. The control elements include application tabs 242 and control buttons 244 with the screen regions pertaining to the control elements being identified for activation by a pointer. There are preferably sixteen application tabs including home, game, movie, music, e-mail, Internet, chat, and search tabs among others. The control buttons 244 illustrated are browser control buttons and include forward, back, stop, reload, scroll up, and scroll down functions. Several other control button configurations are also provided. For example, when a movie media is active in the primary application region 230, the control buttons are changed to play, stop, rewind/reverse, fast forward, slow forward, and pause. As a user activating the various control tabs 242 selects different applications, the control buttons 244 change. The change is instantly accomplished by playing a different interactive movie. To provide these dynamic button controls 244 in a coded fashion would require recompiling code, which is far slower than changing a 50 k movie. The invention also contemplates playing multiple interactive movies simultaneously, and interactive movies that change state to suite the new context without loading a new movie.

The pair of advertiser link regions 222, 224, the features and favorites links region 226, and the audio player region 228 are descriptively named and include configurations instructions to support these applications. However, any type of application could be provided in these screen application regions. When, for example, a user "clicks" on one of the advertiser links, the browser is launched, as described above, and the browser is displayed in the primary application region 230. The control buttons 244 for the browser are also displayed. The user 43 can select a control button 244 to issue commands to the primary application object. For example, the user 43 may choose to stop the load or playback of a file by clicking on the stop control button, while activating the reload control button will refresh the URL last requested. The media files 63 associated with the control elements 242, 244 include the media (graphics, images, and sounds), the control elements, and instructions embedded in the movie and triggered by user activation in the user interface or an event such as a timer.

As stated above, the environment is a layered media environment. To that end a background movie 248 is played beneath substantially all of the screen application regions. The background movie provides the borders and partitions of the various screen application regions. The other interactive applications are then overlaid onto the background movie, which is preferably a static image without direct interactive controls. A browser application 250 (FIG. 11H) is then operated in a selected one of the plurality of screen application regions. Preferably, the browser is operated in the primary screen application region 230, and is provided with a top browser tab 246. Multiple applications, preferably up to five, can be operated in the primary screen application region. Each application has its own identification tab, so that a user can easily bring the desired application to the front of the primary application region 230. The identification tabs are preferably provided by an interactive movie.

With the background movie playing behind the primary application area and other interactive control and/or display elements, the browser functions as an integrated application within the media environment. Embedding the browser gives the user a consistent user interface and on-screen representation of the environment (other images and controls) while ensuring that files displayed within the browser retain their native format and functionality. This method also allows the browser to be controlled by the media environment, either by application events, events contained in other movie areas or user action on interactive control elements within other movie components. The application gives the browser object both the appearance and function of an embedded applet which has full native capability as well as interactive capability with the rest of the environment and other components contained therein.

Figure 11A:
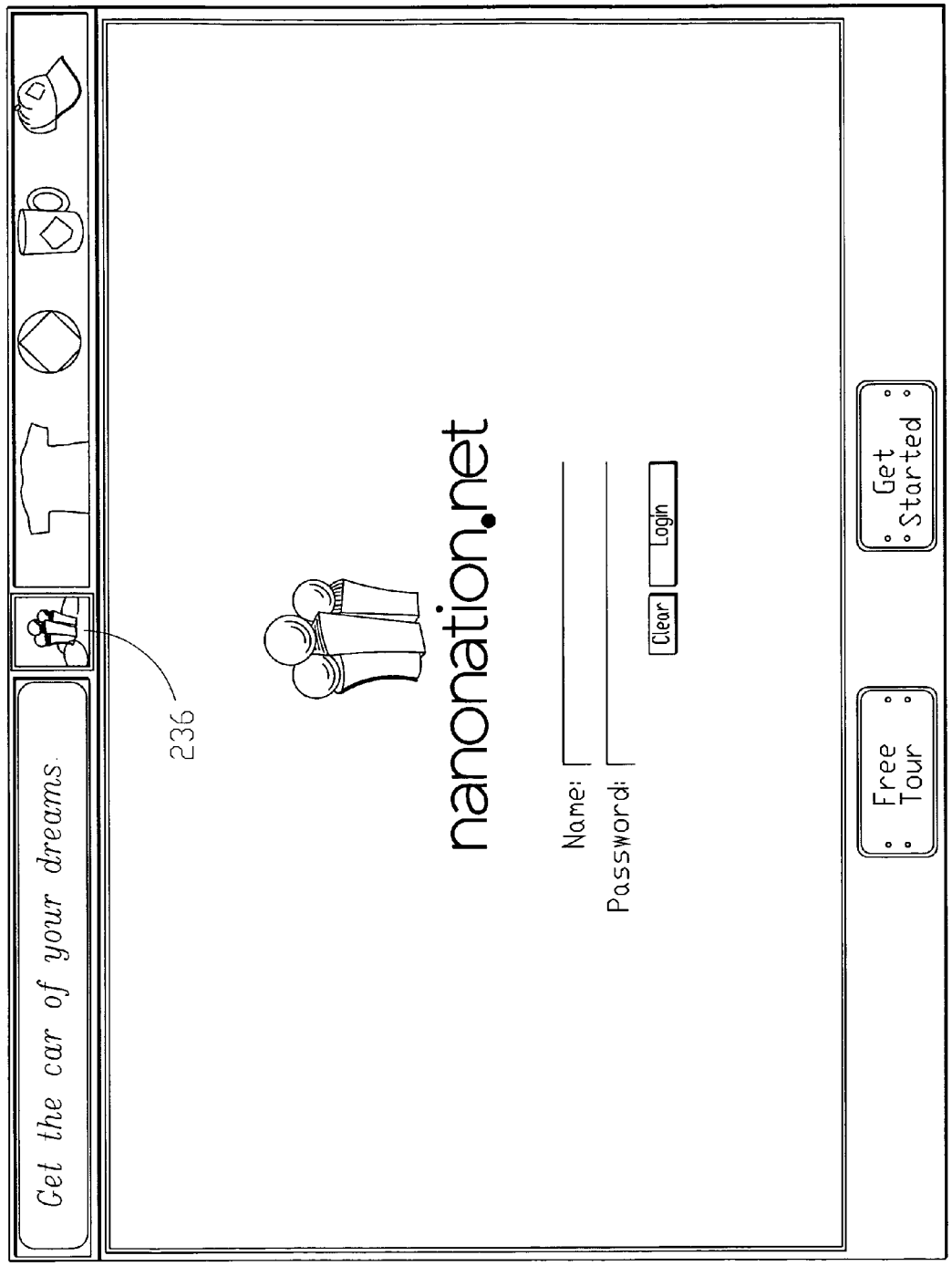
FIG. 11A is an elevational view of a user interface illustrating a particular step in a user entertainment session.
Figure 11B:
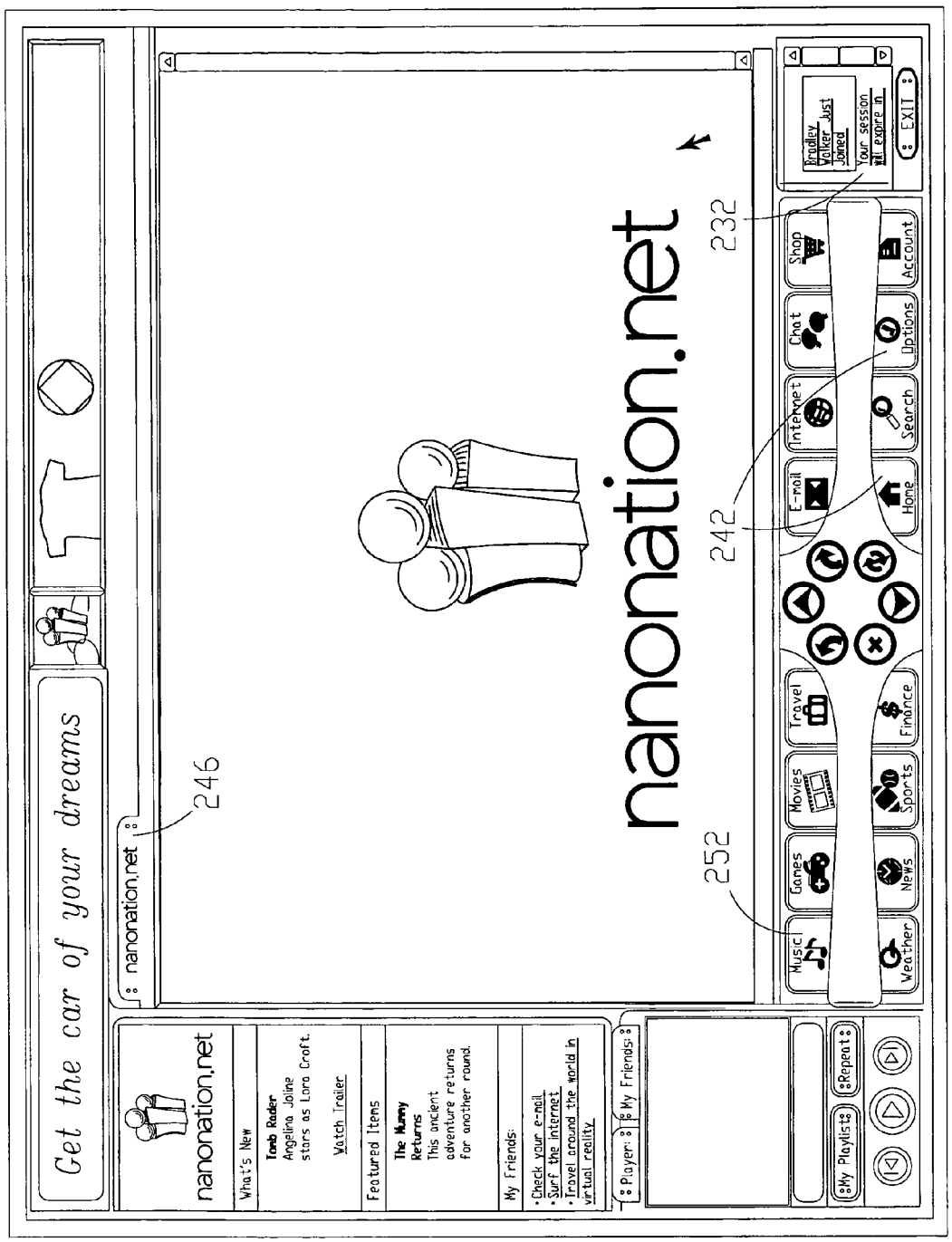
FIG. 11B is an elevational view of a user interface illustrating a particular step in a user entertainment session.
Figure 11C:
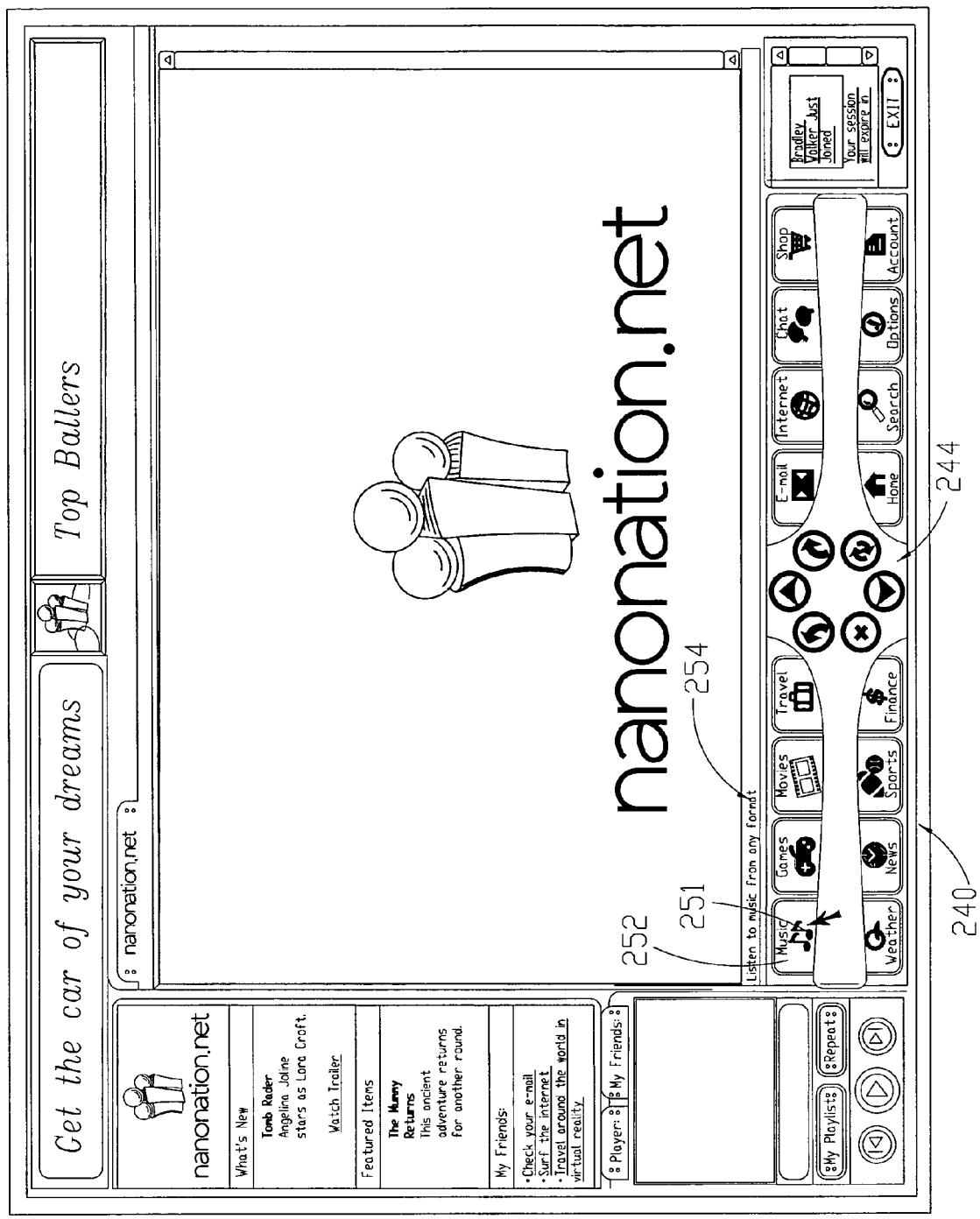
FIG. 11C is an elevational view of a user interface illustrating a particular step in a user entertainment session.
Figure 11D:
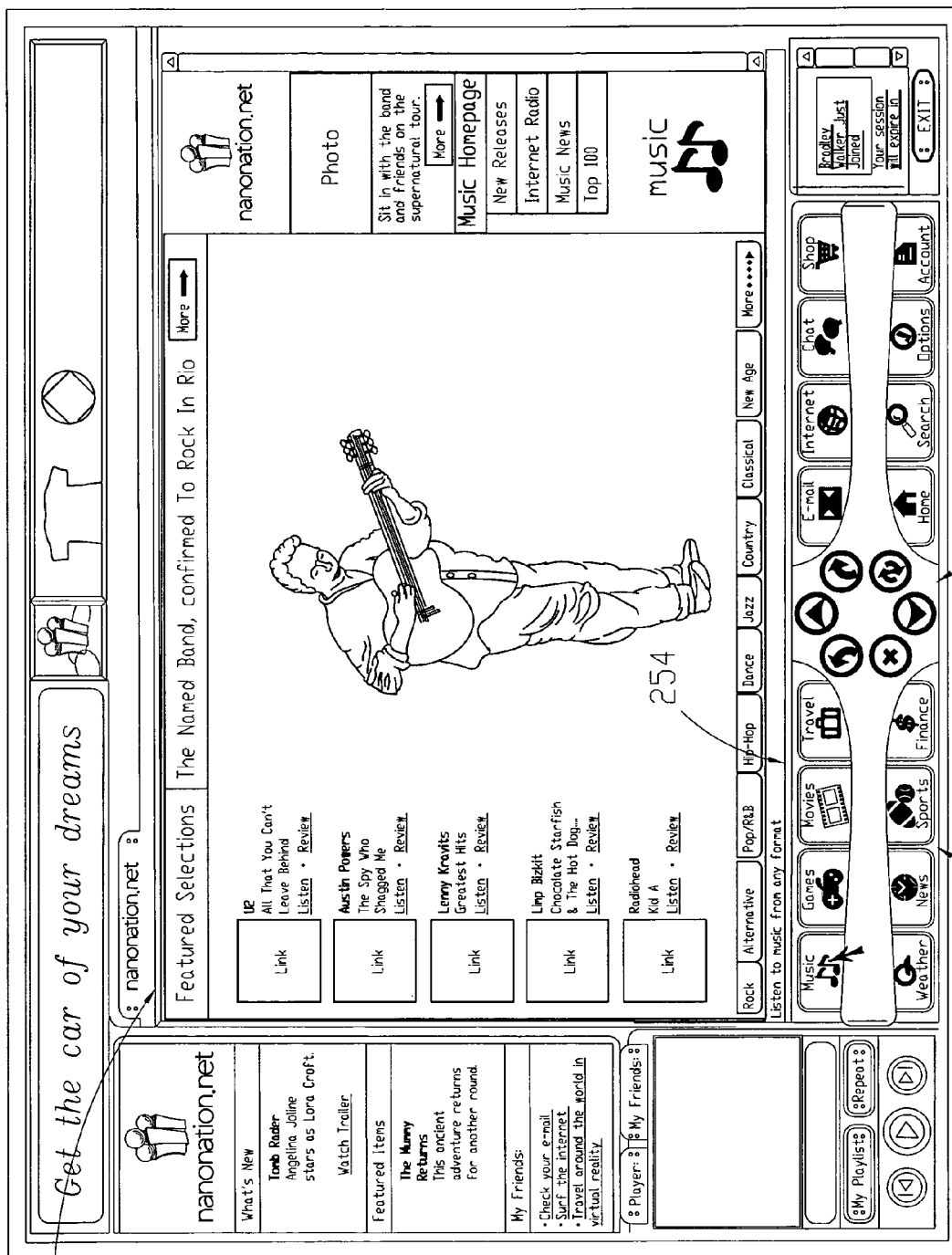
FIG. 11D is an elevational view of a user interface illustrating a particular step in a user entertainment session.
Figure 11E:
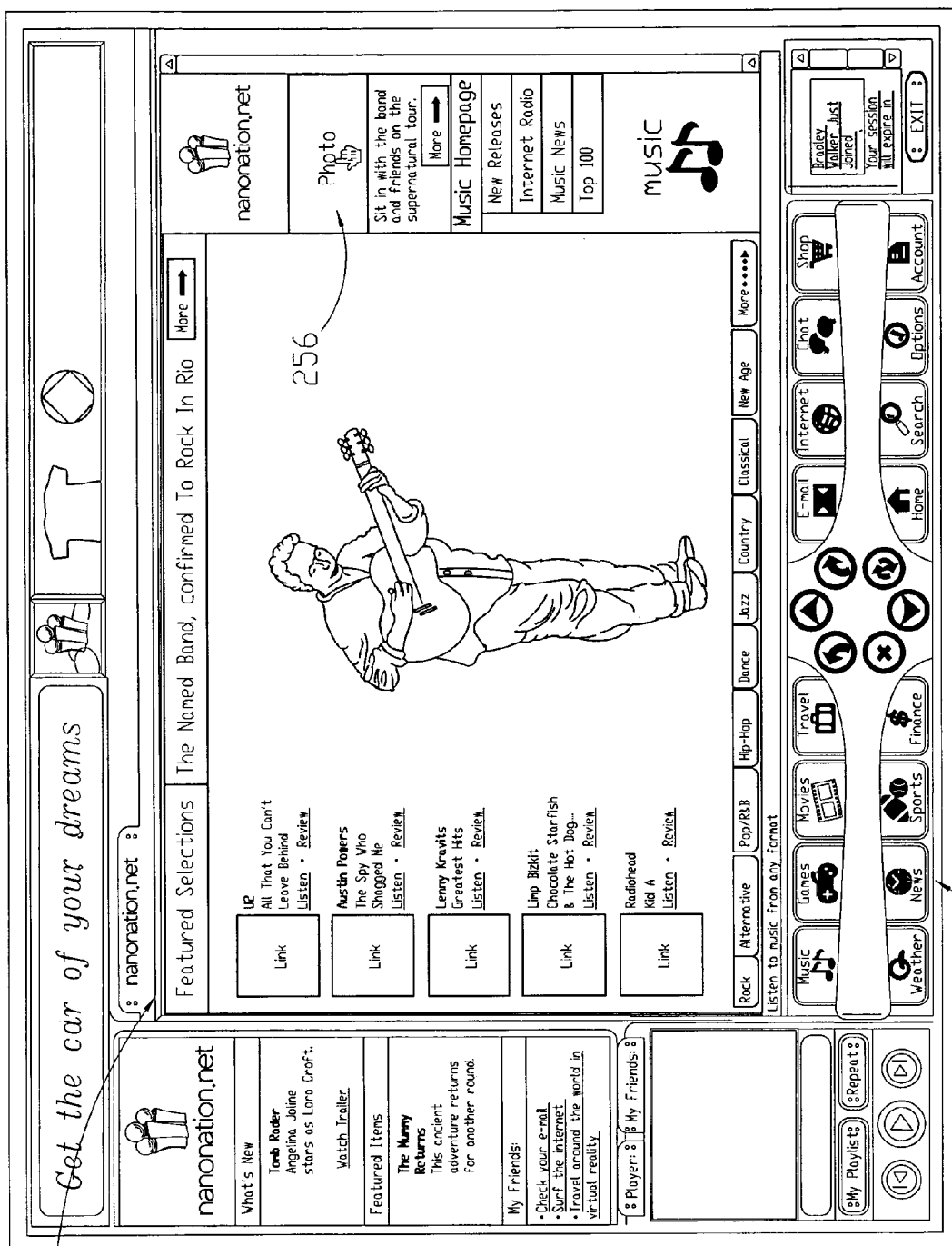
FIG. 11E is an elevational view of a user interface illustrating a particular step in a user entertainment session.
Figure 11F:
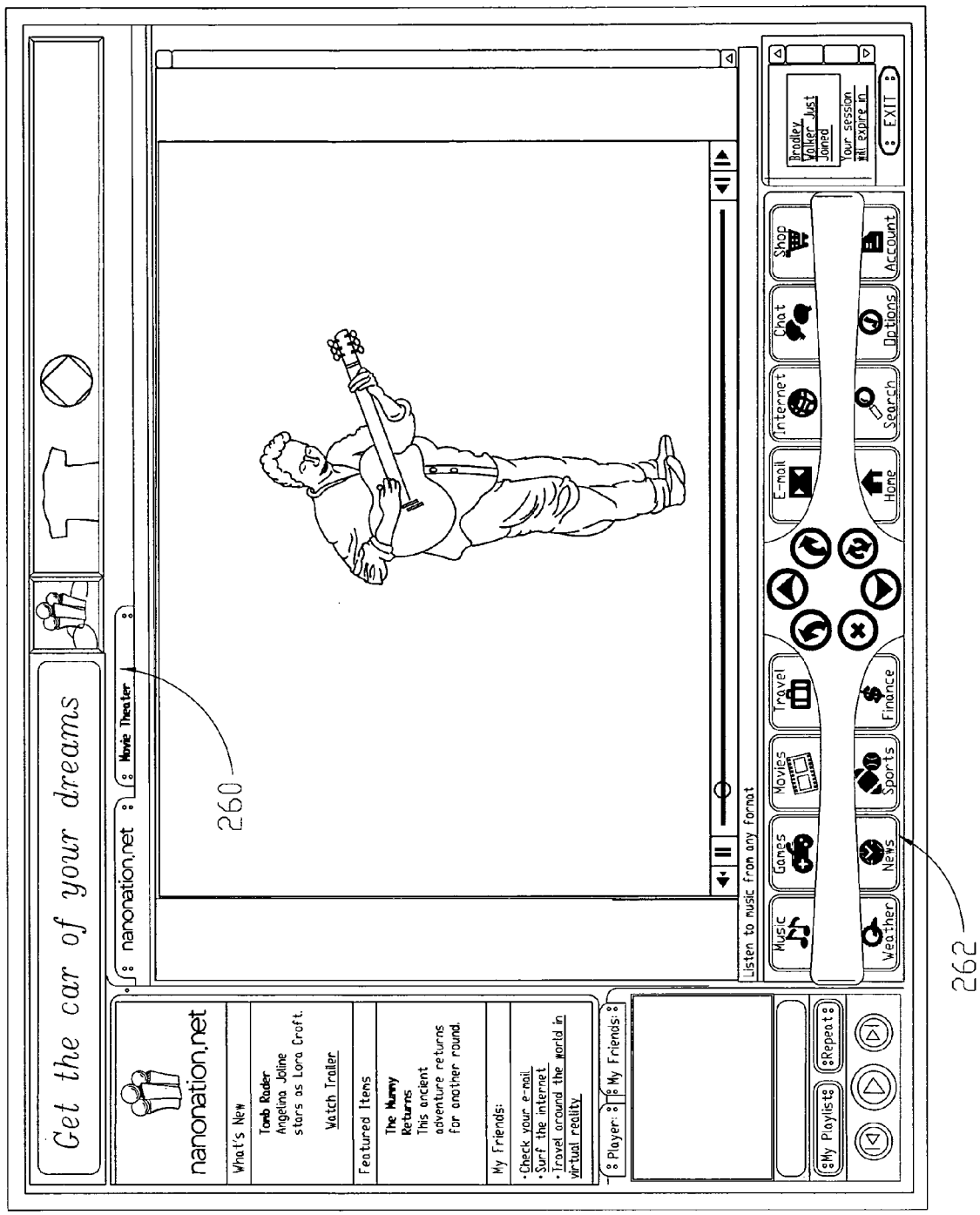
FIG. 11F is an elevational view of a user interface illustrating a particular step in a user entertainment session.
Figure 11G:
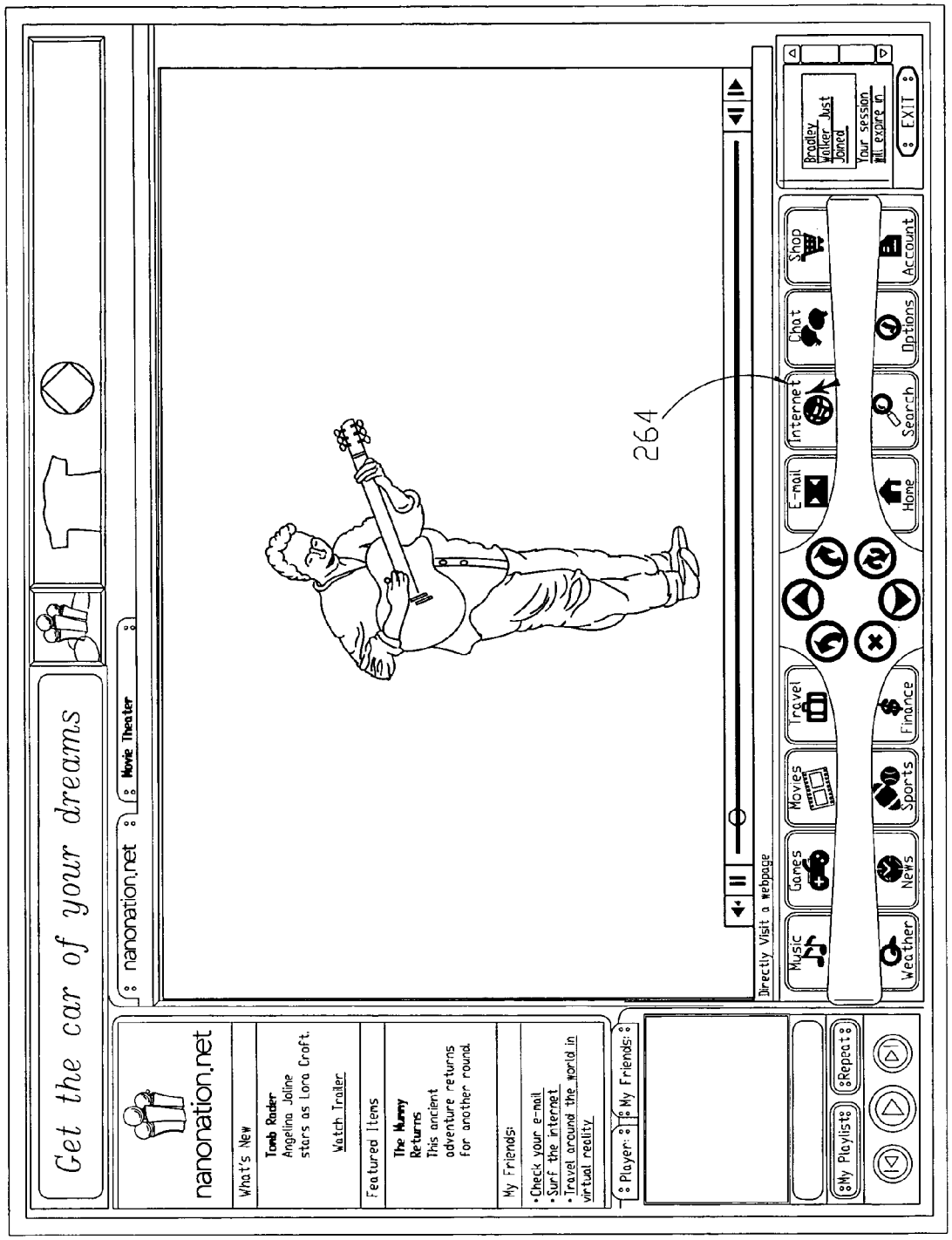
FIG. 11G is an elevational view of a user interface illustrating a particular step in a user entertainment session.
Figure 11H:
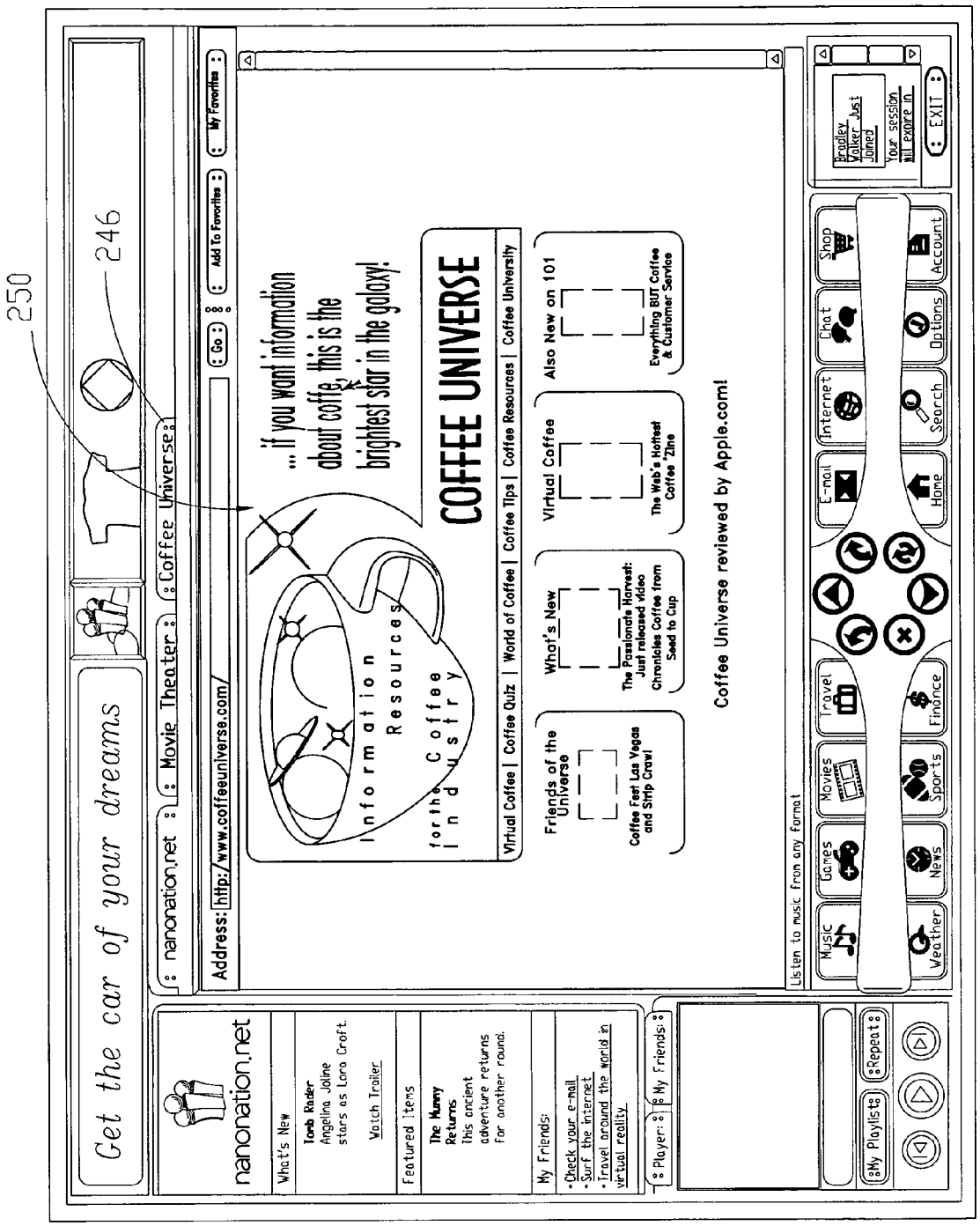
FIG. 11H is an elevational view of a user interface illustrating a particular step in a user entertainment session.
Figure 11I:
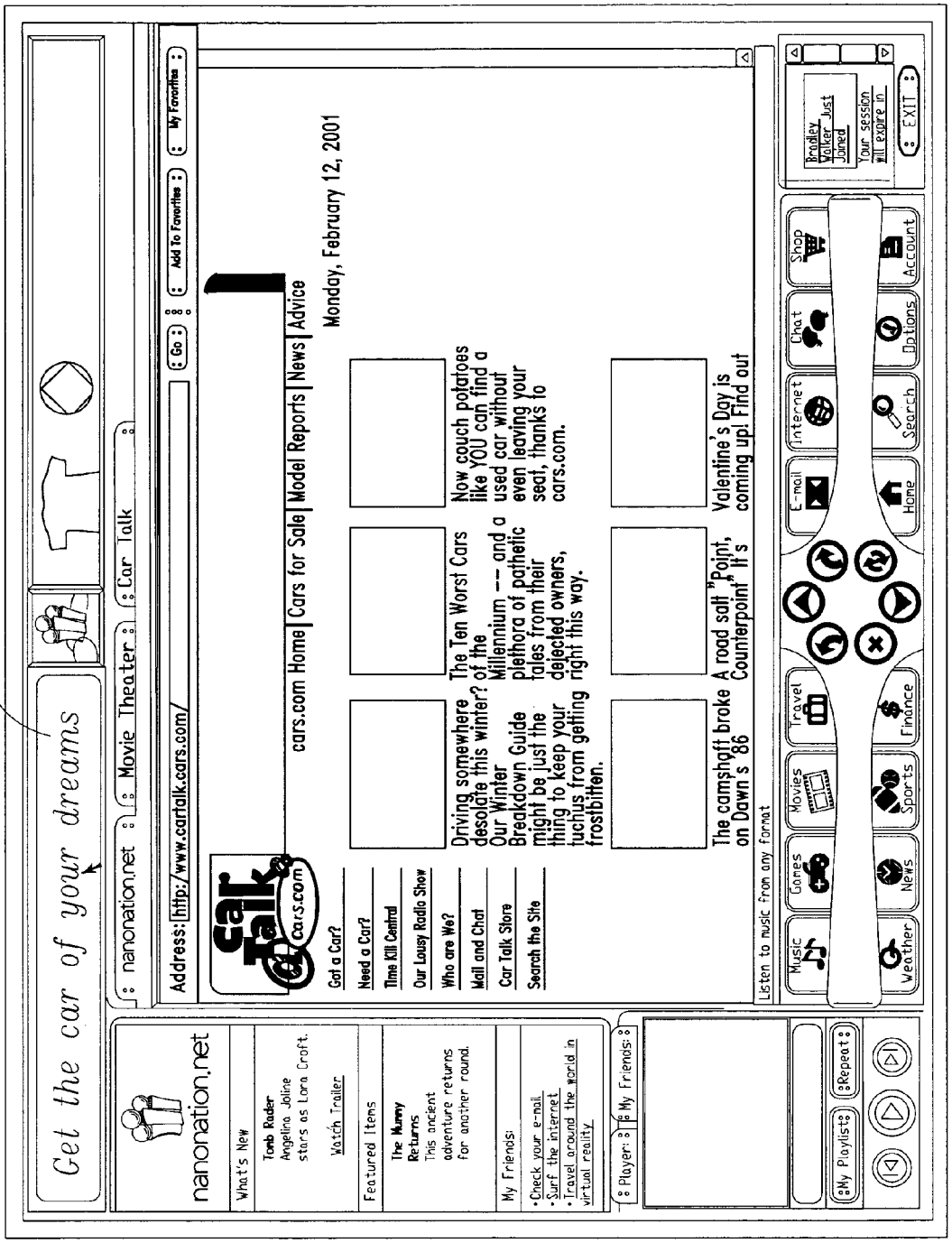
FIG. 11I is an elevational view of a user interface illustrating a particular step in a user entertainment session.
Figure 11J:
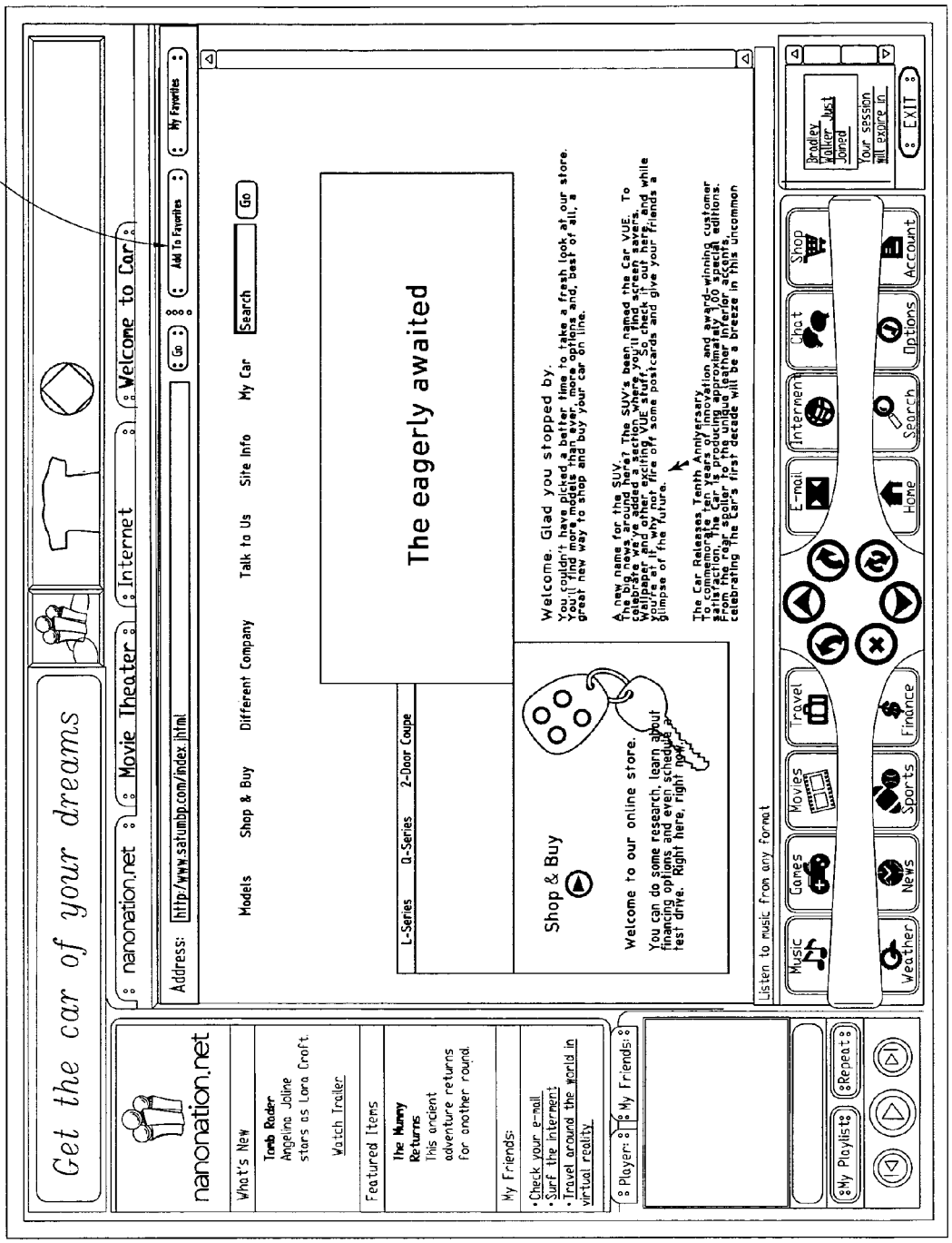
FIG. 11J is an elevational view of a user interface illustrating a particular step in a user entertainment session.

To further illustrate the present invention, FIG. 11A through FIG. 11J illustrate an exemplary user session, which will be briefly described. In FIG. 11A the user 43 enters his or her name and password and swipes either a prepaid or credit card in a provided magnetic card reader (not shown). Upon validation by the network servers 26, 28, 30, the user is greeted by the initial screen of FIG. 11B. This is the entry page for the environment. FIG. 11C illustrates the user moving the pointer 251 over the music tab 252 which highlights the music tab and displays text about the action associated with the tab in the main window text area 254. The specific text displayed in this example is "listen to music for many formats." After clicking the pointer device button, the user goes to the music homepage 258 illustrated in FIG. 11D. This is an internal page with links to other media within the music category. At this point, the browser control buttons 244 are still displayed in the interactive control movie. In FIG. 11E the user selects the music video button for "smooth" at location 256. A movie application 260 illustrated in FIG. 11F is then presented in the primary application region over the main music page and in its own panel. The interactive control movie 262 for a movie application is loaded and the movie media is loaded and starts playing "smooth." In FIG. 11G the user then highlights the Internet tab 264 to go to the World Wide Web. Upon clicking the button, a new web browser page is created and displayed in a new panel with the web browser therein. In the illustration displayed in FIG. 11H the user has selected the coffee universe though any URL could be selected. In FIG. 11I the user selects the Saturn ad banner 266 in the top advertising region and clicks. A forth web panel 268 is opened as illustrated in FIG. 11J, and the user is taken to' the selected URL for Saturn.

Figure 12A:
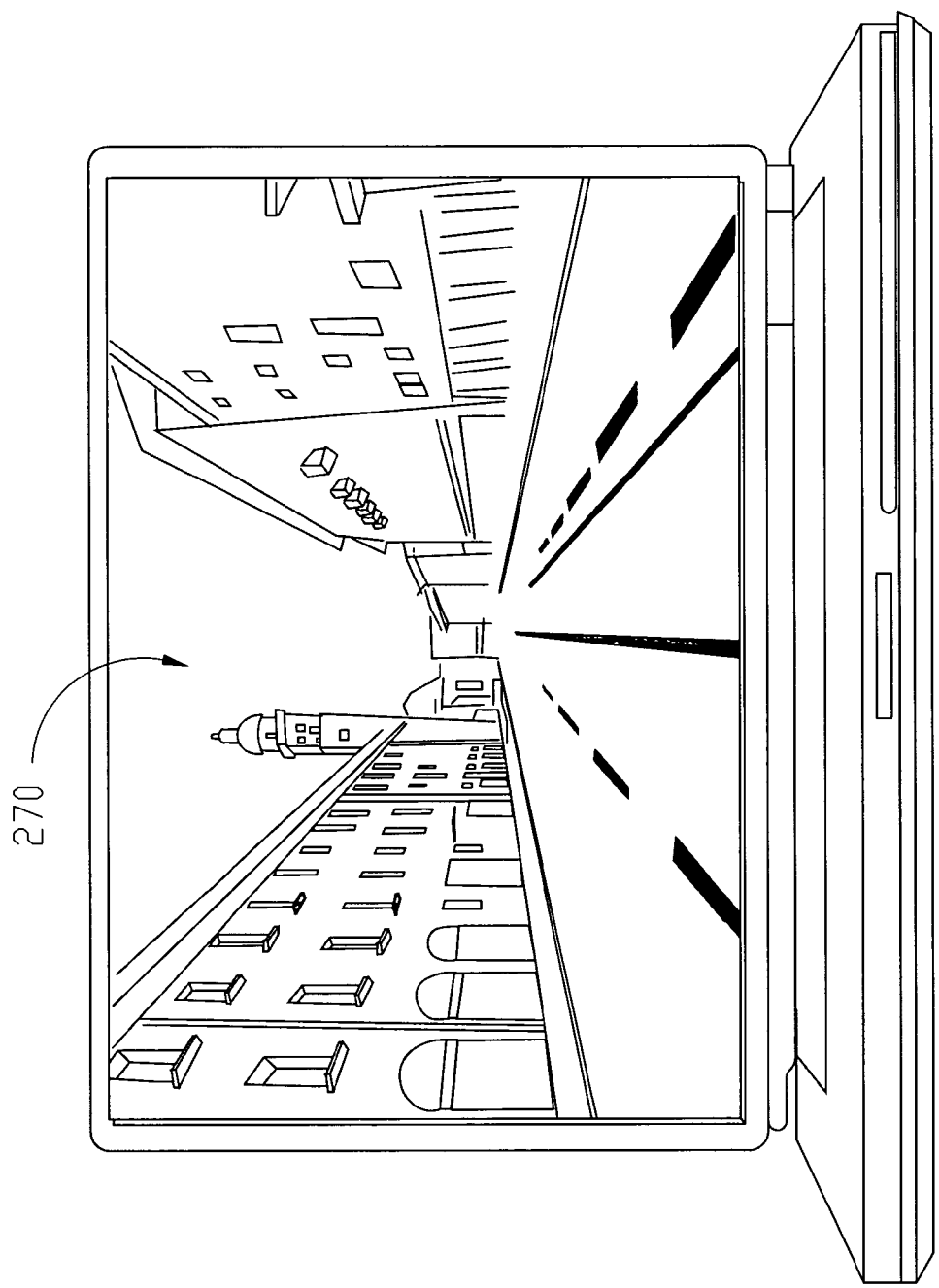
FIG. 12A is an elevational view of a user interface illustrating a specific step in a user commercial session.
Figure 12B:
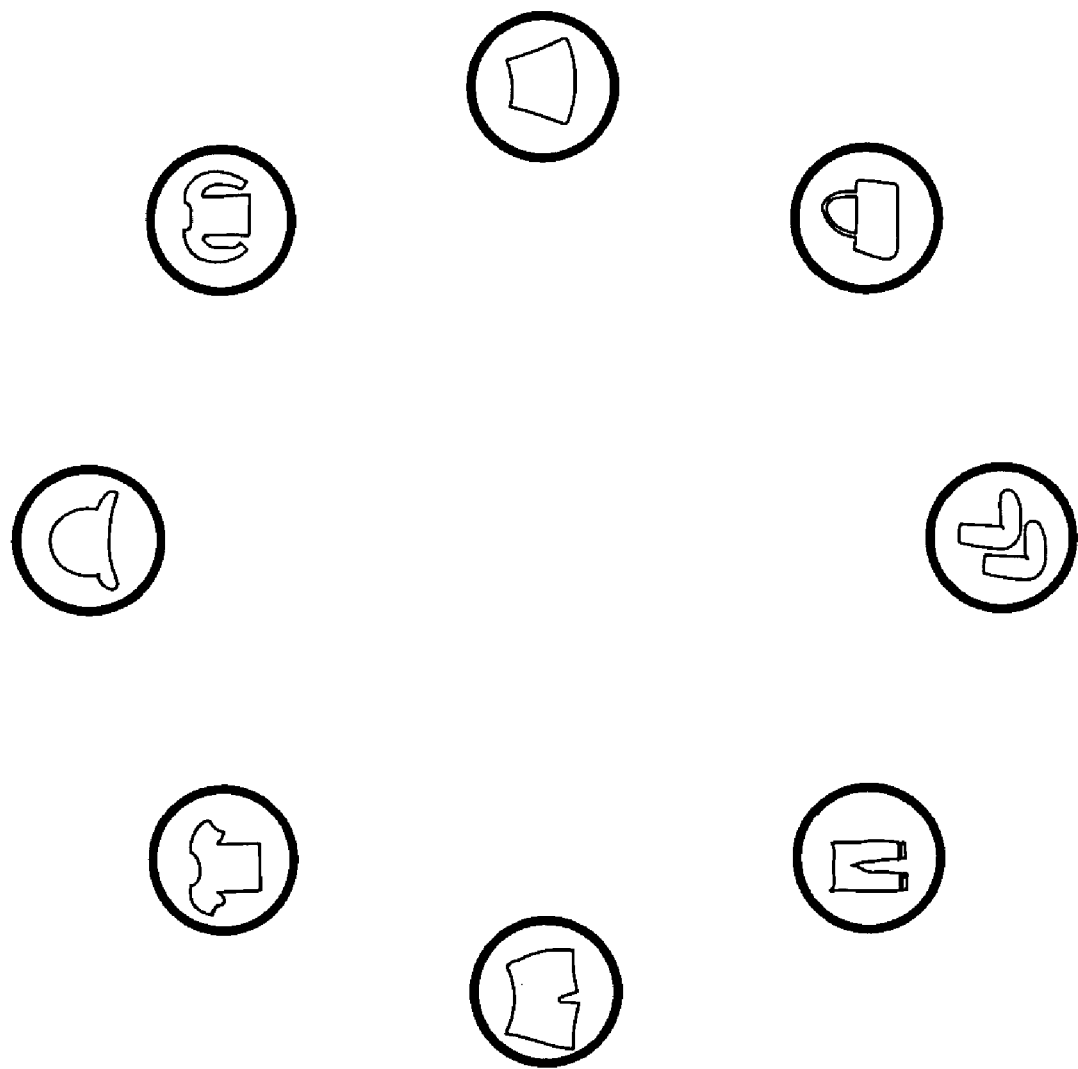
FIG. 12B is an elevational view of a user interface illustrating a specific step in a user commercial session.
Figure 12C:
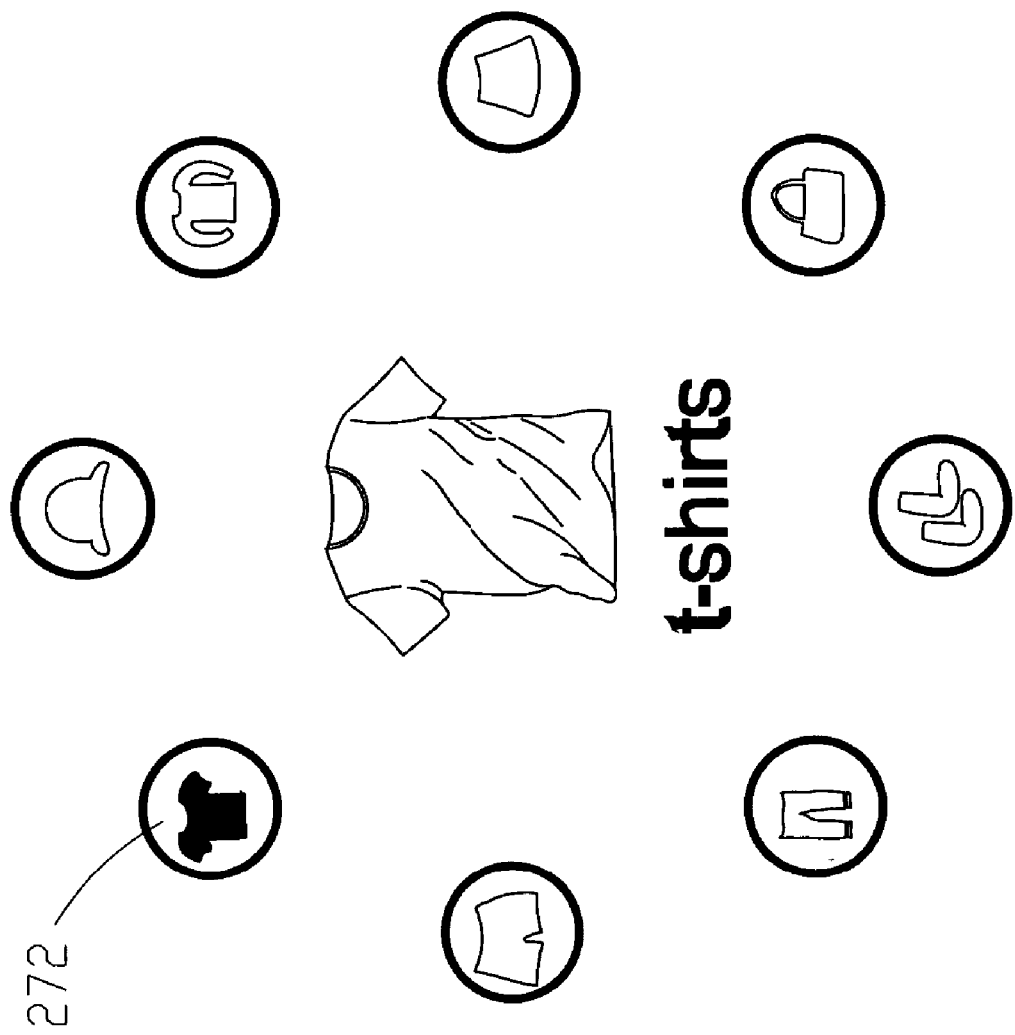
FIG. 12C is an elevational view of a user interface illustrating a specific step in a user commercial session.
Figure 12D:
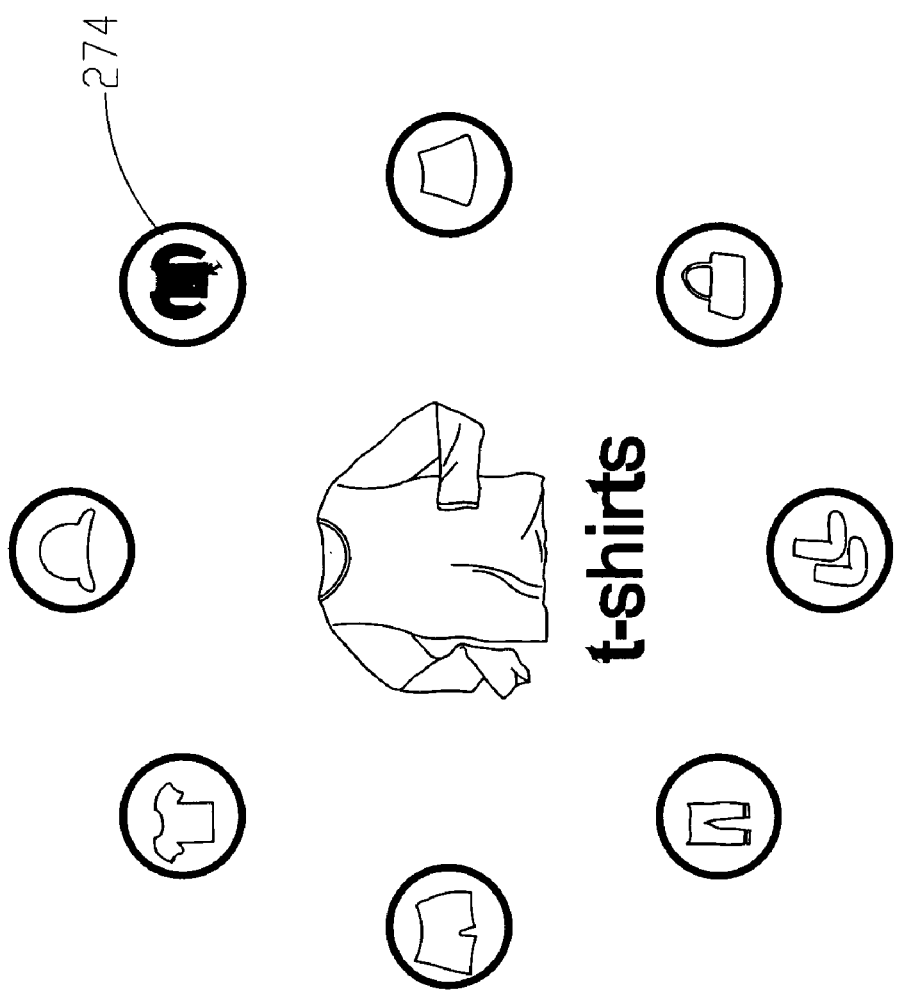
FIG. 12D is an elevational view of a user interface illustrating a specific step in a user commercial session.
Figure 12F:
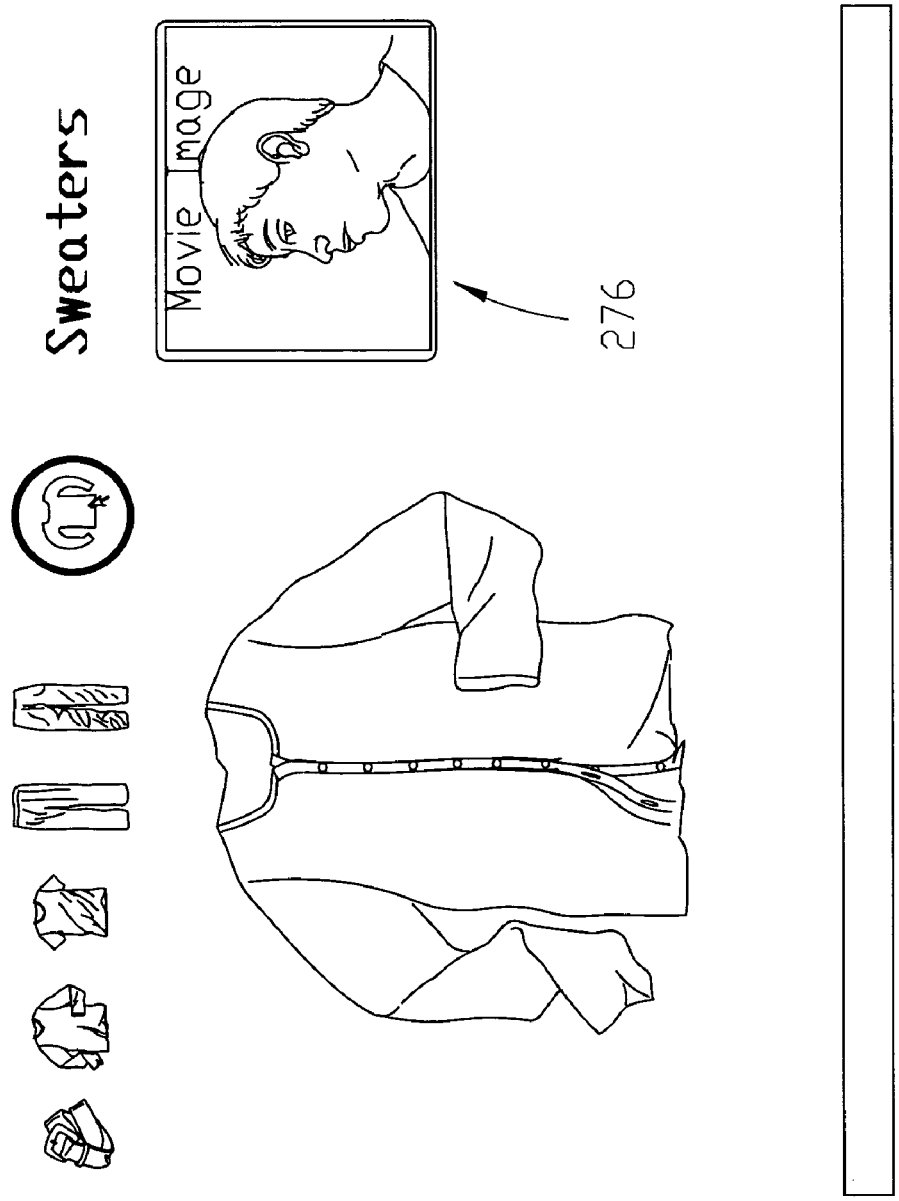
FIG. 12F is an elevational view of a user interface illustrating a specific step in a user commercial session.
Figure 12G:
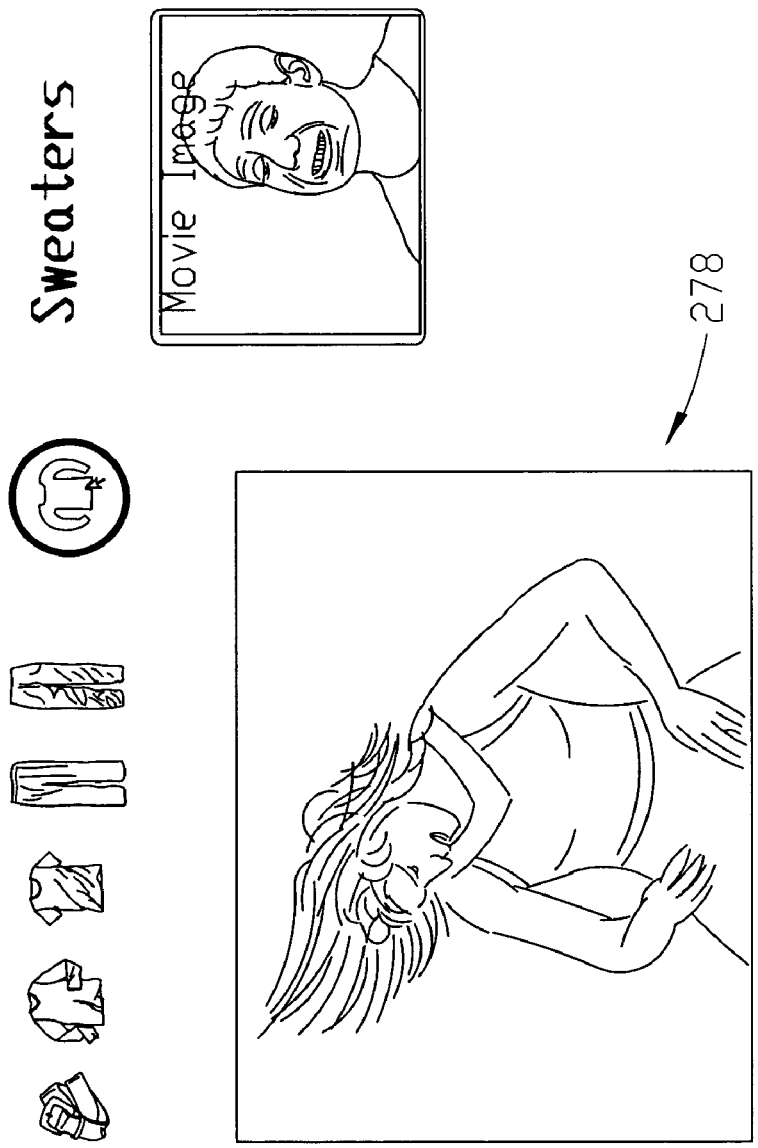
FIG. 12G is an elevational view of a user interface illustrating a specific step in a user commercial session.
Figure 12H:
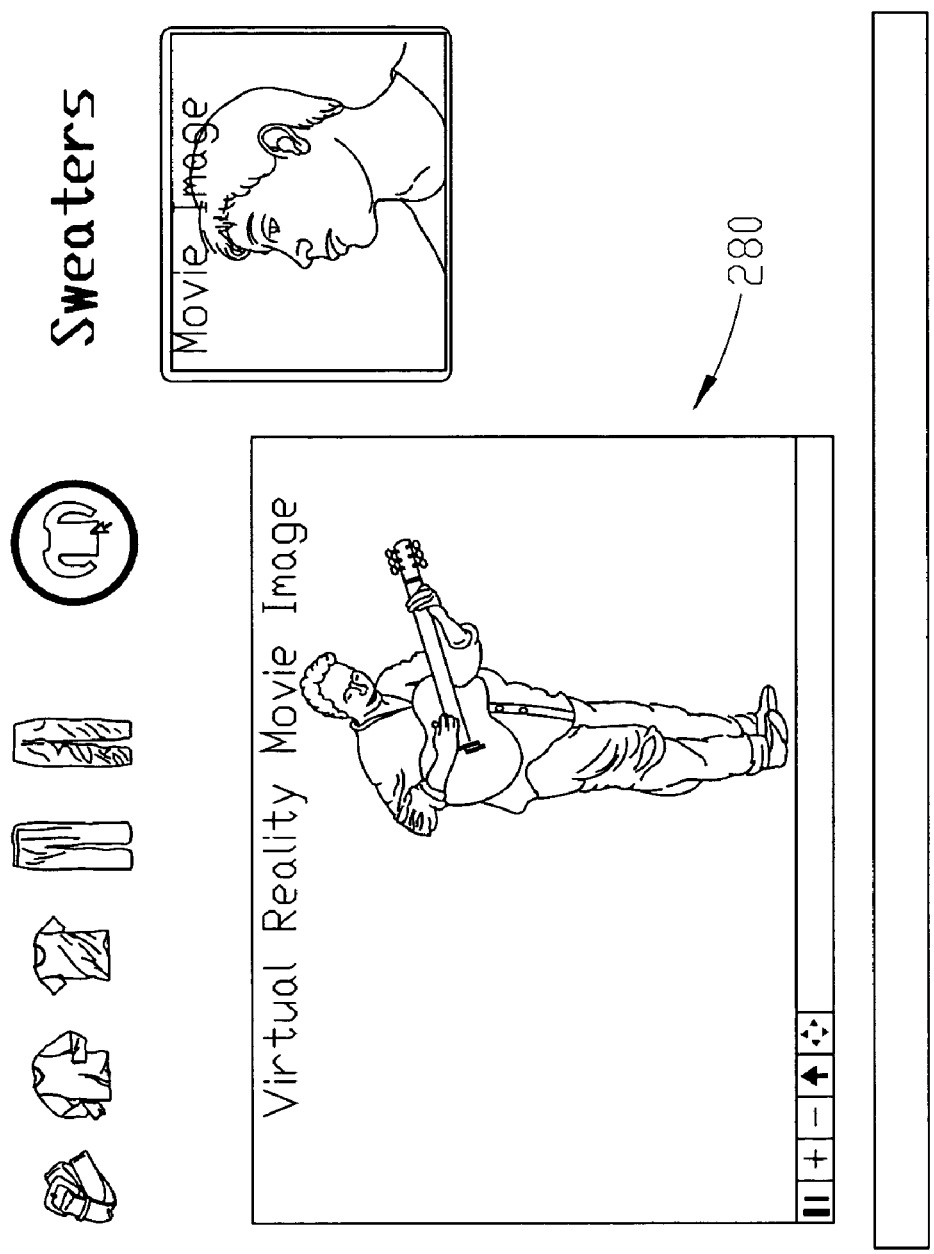
FIG. 12H is an elevational view of a user interface illustrating a specific step in a user commercial session.
Figure 12I:
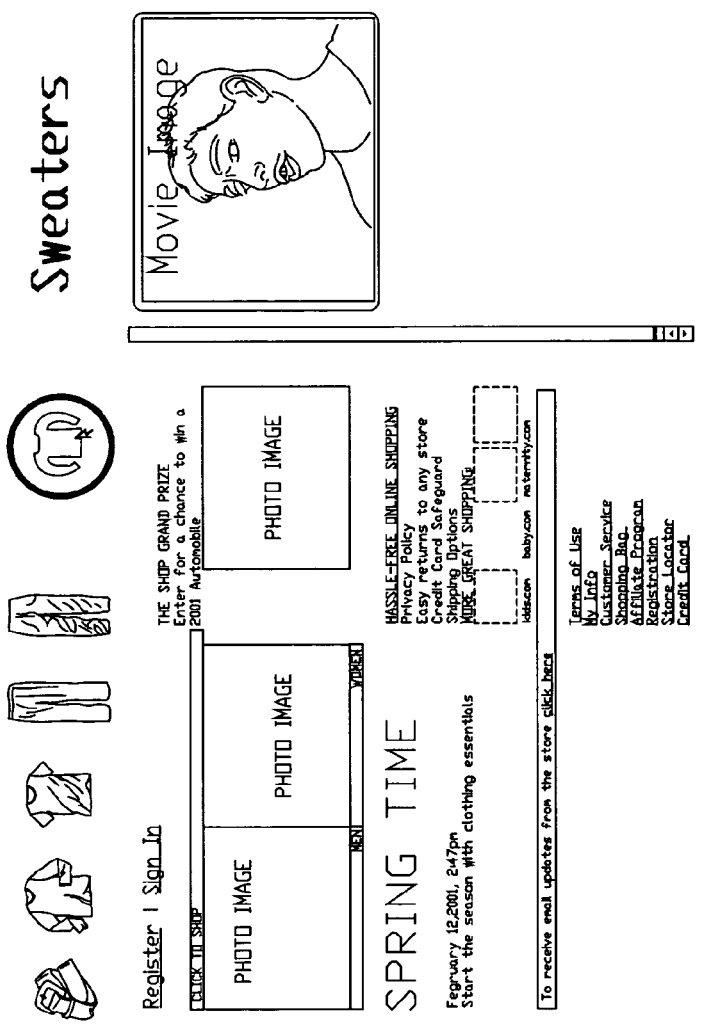
FIG. 12I is an elevational view of a user interface illustrating a specific step in a user commercial session.

Another user session in a commercial setting is illustrated in FIG. 12A through FIG. 12I. For this session it is understood that the user is in the context of a retail establishment. Thus the local configuration file provides a completely different starting point for this retail venue. FIG. 12A illustrates the start of the user session with a motion picture commercial 270. The user interacts with the system by pressing any key or clicking the provided pointer device and the introduction screen illustrated in FIG. 12B replaces the movie. The introduction screen is an interactive display designed to guide the user to other areas of the system. In FIG. 12C the user is illustrated selecting the t-shirt option 272 from the screen thereby changing the graphics on the main page to the selected item as they point to each of the items shown. In FIG. 12D the user has selected the sweater section 274 and sees a preview of the selection. These views are all Flash based. Upon selecting the sweater section a talking head attendant movie 276 illustrated in FIG. 12E appears and begins introducing the selection. The talking head is provided in the form of a movie. In FIG. 12F the attendant movie clip 276 has automatically taken the user to more information as the narrative moves along without user interaction. Thus the movie is controlling the other application piece, that is, the display of the item for sale. In FIG. 12G the graphic content is replaced with another movie 278 which is synchronized to the actions of the attendant movie. FIG. 12H illustrates a VR (virtual reality) movie 280, which has replaced the synchronized movie from FIG. 12G. The user can move around and interact with the VR movie. When an item of interest is finally selected, the VR movie is replaced by a web browser component 282 illustrated in FIG. 12I. Again the attendant movie explains and interacts with the browser.

Figure 13:
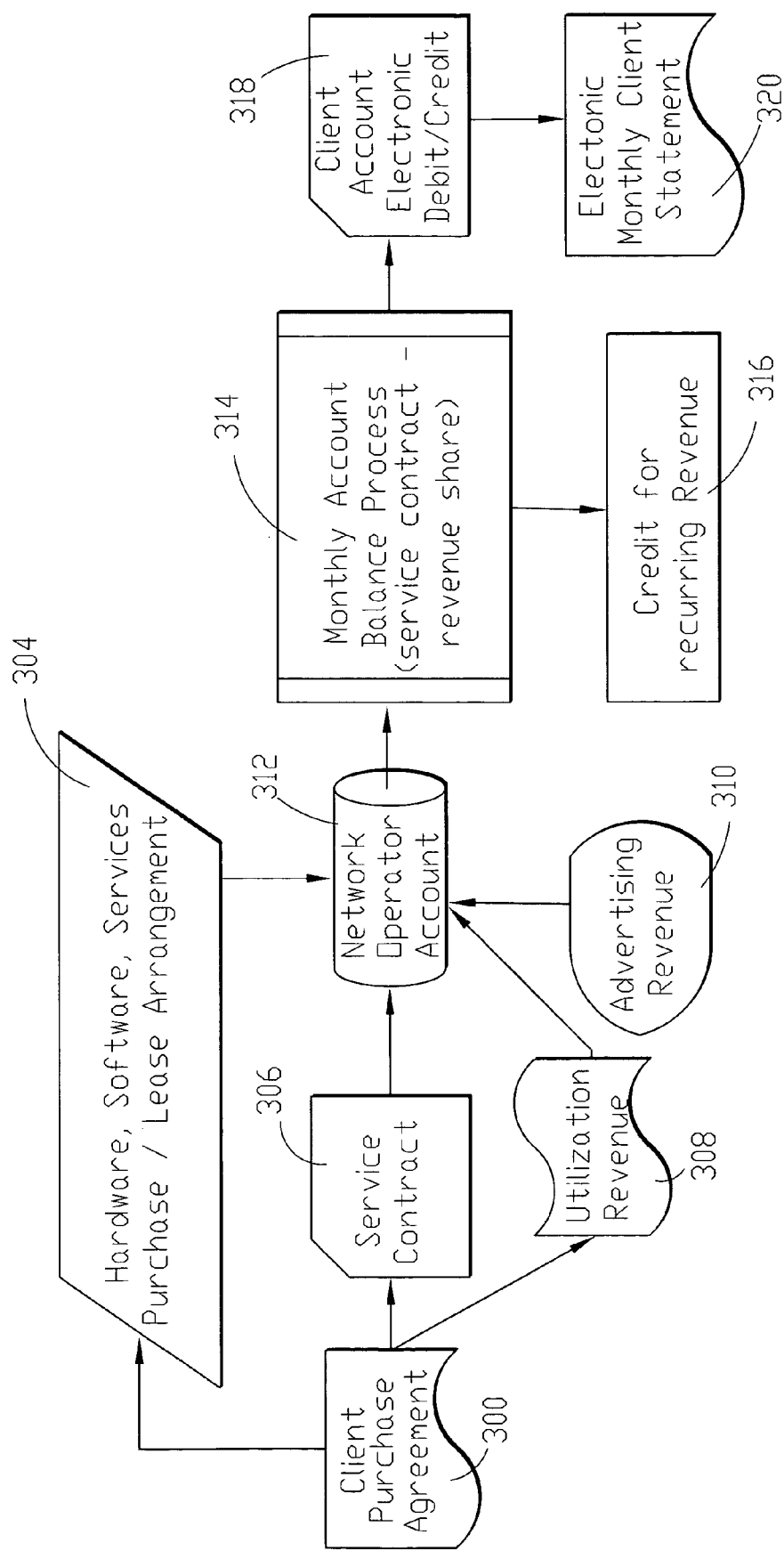
FIG. 13 is a schematic block diagram of a client purchase agreement business plan.
Figure 14:
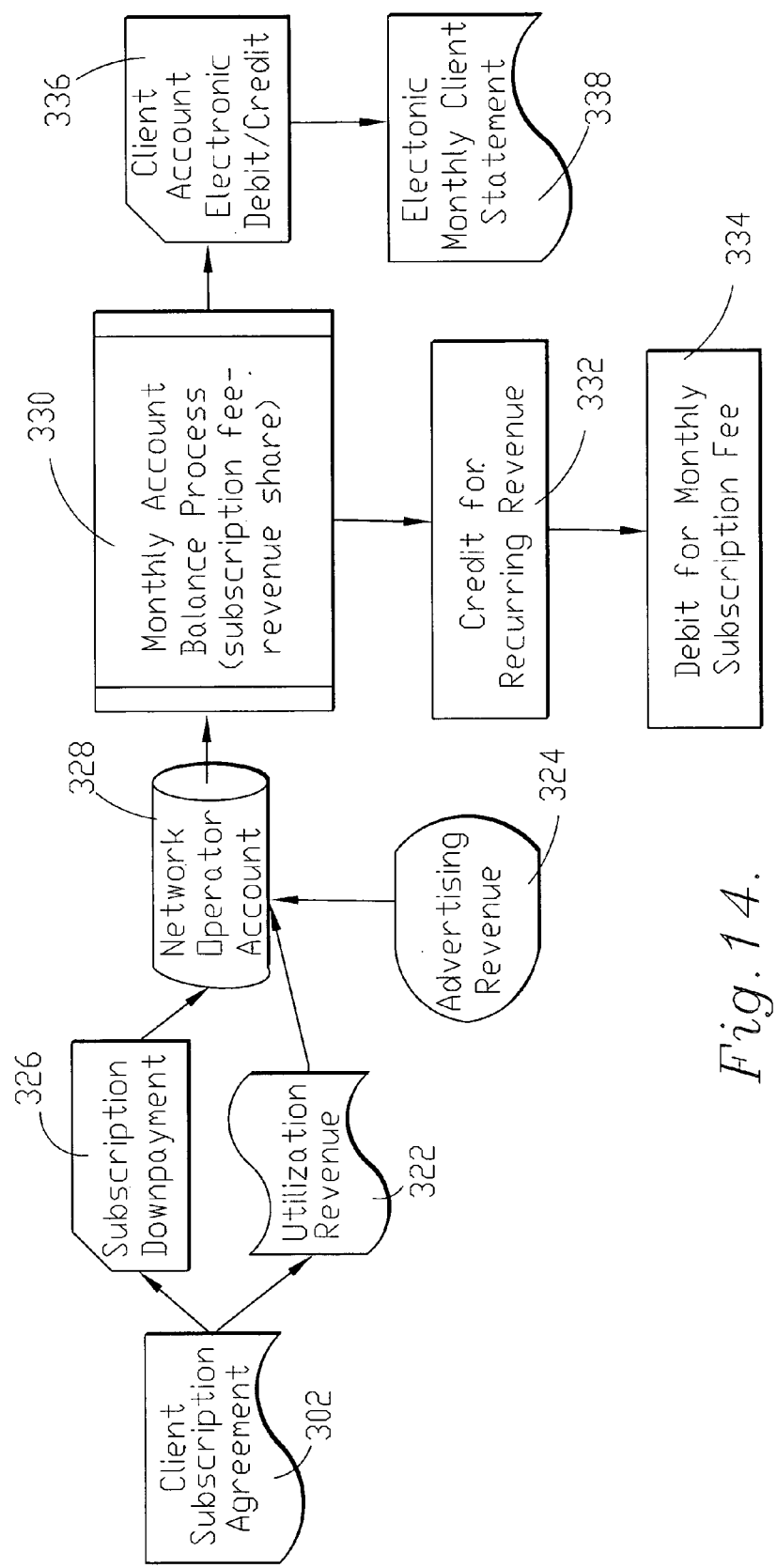
FIG. 14 is a schematic block diagram of a client subscription agreement business plan.

The above described computer network 20 and GUI 32 are preferably implemented through either a client purchase agreement business model 300 (FIG. 13) or a client subscription agreement business model 302 (FIG. 14). In FIG. 13, the client purchase agreement includes four (4) sources of revenue: hardware 304, service 306, utilization 308, and advertising 310. The network operator 312 receives hardware revenue 304 from the client. Specifically, the client is the owner or operator of the sports bar or other establishment utilizing the computer network 20 and having terminals 22 installed at the bar. The hardware revenue 304 is in the form of equipment purchase or lease, and as the computer network 20 is establish and grows, the hardware revenue also derives from hardware upgrades. The hardware revenue 304 also includes revenues paid by the client for installation of the hardware. The service contract revenue 306 is simply income from required service on the hardware. The services generating the service revenue 306 can be provided directly by the network operator or these services are contracted out to a local service company. The regular recurring utilization revenue derives from customers using the system. Customers pay for system/terminal use with a credit card, prepaid card, or a monthly-billed account, which bills on a use basis or a flat fee. The regular recurring advertising revenue 310 is received from advertisers and is based on a display of ads in one of screen advertiser link regions 222, 224. Additionally or alternatively, the advertising revenue 310 can also be based on customer purchases.

Preferably on a monthly basis, a monthly account statement 314 is generated. The monthly account balance credits, at step 316, the client for the recurring utilization and advertising revenue. A credit 318, preferably electronic, is given to the client, and an electronic monthly statement 320 is transmitted.

The subscription agreement business model 302 illustrated in FIG. 14 operates similarly to the purchase model 300. The recurring utilization 322 and advertising 324 revenues are received as described, but the only other revenue received is the subscription down payment 326. At system startup, the client pays the first month subscription fee or down payment 326 to the network operator 328. In the monthly account balance process 330, the client again receives a credit 332 for the recurring utilization and advertising revenues 322, 324, but there is also a debit 334 for the monthly subscription fee. If the revenue credit 332 is greater than the subscription fee debit 334, then the client account receives an electronic credit for the difference at step 336. If however, the debit 334 is greater than the revenue credit 332, the client account receives an electronic debit for the difference at step 336. The computer system 20 then generates a monthly account statement 338 reflecting the credit or debit to the client account.

Figure 15:
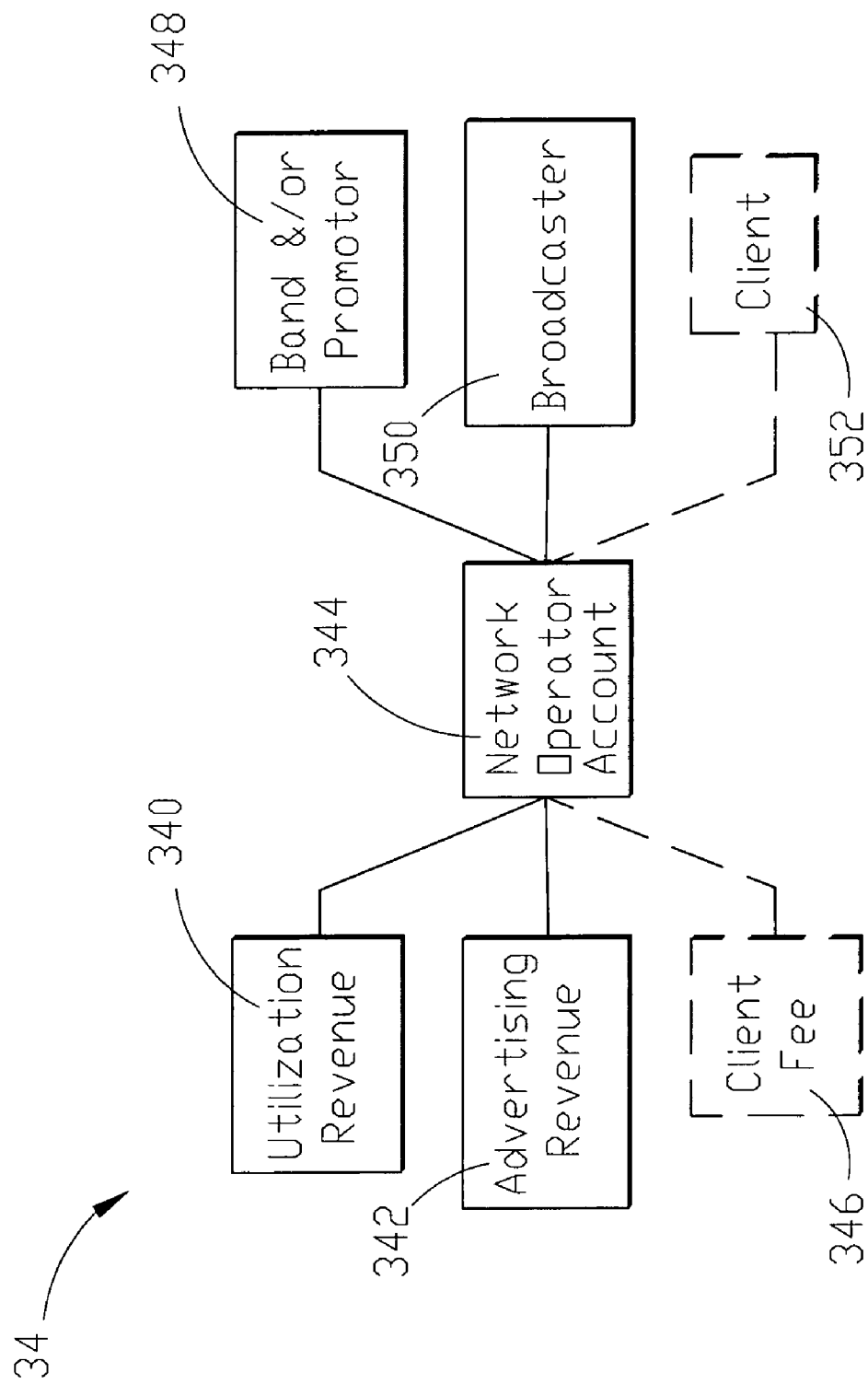
FIG. 15 is a schematic block diagram of a revenue division model according to the present invention.

When a multimedia event occurs at one location and it is broadcast to other locations, revenue is distributed as illustrated in FIG. 15. Utilization 340 and advertiser 342 revenues are paid to the network operator 344. Alternatively a client fee 346 is also paid to the network operator 344. The network operator 344 then distributes the revenue to the band and/or promoter 348 and the broadcaster 350. The network operator 344 also keeps a share of the income. The client 352, alternatively also receives a portion of the income or if the client's share 352 of the income is greater than the client fee 346, the client receives some of the income.

Thus, a context sensitive, dynamic user interface is disclosed which is programmed and developed from a central location and utilizes interactive control movies (instead of hard programming), browsers embedded within movies, and application layering in single screen application regions to provide a versatile computer network thereby increasing expansion of revenue generating computers into nontraditional venues. While preferred embodiments and particular applications of this invention have been shown and described, it is apparent to those skilled in the art that many other modifications and applications of this invention are possible without departing from the inventive concepts herein. It is, therefore, to be understood that, within the scope of the appended claims, this invention may be practiced otherwise than as specifically described, and the invention is not to be restricted except in the spirit of the appended claims. Though some of the features of the invention may be claimed in dependency, each feature has merit if used independently.

GLOSSARY

Applet—a program designed to be executed from within another application. Unlike applications applets cannot be executed directly from the operating system.

Application—a program or group of programs designed for end users. Applications include programs such as browsers, word processors, and spreadsheets.

ASP—application service provider—third party entities that manage and distribute software based services and solutions to customers across a WAN from a central data center.

Bandwidth—the amount of data that can be transmitted in a fixed amount of time. For digital devices the bandwidth is typically expressed in bits per second (bps) and, for analog devices the bandwidth is typically expressed in cycles per second (Hz).

BLOB—binary large object—a collection of binary data stored as a single entity in a database management system. BLOB's are used primarily to hold multimedia objects such as images, videos, and sound, though they can also be used to store programs.

Cache—a special high-speed storage mechanism. Frequently accessed files are stored in memory for quick access by an operating application.

Container Object—is an object that acts as a holding container for one or more other objects (movies, browsers, etc.).

CPU—central processing unit—the CPU is the brains of the computer and is where most calculations take place. Typically the CPU is housed in a single-chip microprocessor.

CRT—cathode ray tube—the technology used in most televisions and computer display screens. A CRT works by moving an electron beam back and forth across the back of the screen to illuminate phosphor dots on the inside of the glass tube.

DBMS—database management system—a collection of programs that enables the storage, modification, and extraction of information from the database.

DSL—digital subscriber lines—there are many types of DSL technologies relating to high data rate transfer over existing copper telephone lines.

Embedded Object—an object created with one application and embedded into a document created by another application. Embedding the object in contrast to simply inserting or pasting it in, ensures that the object retains its original format. The embedded object can be modified with the original program.

FTM—flat technology monitor—while conventional display screens are curved, flat technology monitors have a flat display screen to reduce glare.

FTP—file transfer protocol—guidelines used on the Internet for sending files.

GUI—graphical user interface—a program interface that takes advantage of the computer's graphics capabilities to make the program easier to use by presenting controls and options to the user. GUI's include several basic components including a pointer, which is a symbol such as a small, angled arrow, which appears on the display screen and it is moved about by a pointing device such as a mouse or a trackball.

HTTP—hypertext transfer protocol—guidelines defining how messages are formatted and transmitted over the Internet.

Hub—a common connection for devices in a network. Hubs are commonly used to connect segments of a LAN and typically include multiple ports.

IDE—intelligent drive electronics or integrated drive electronics—an IDE is an interface for storage devices in which the controller is typically integrated into the disk or CD Rom drive.

ISDN—integrated services digital network—an international communications standard for sending voice, video, data over digital telephone lines or normal telephone wires. ISDN supports increased data transfer rates with modern versions of ISDN supporting transmission rates of up to 1.5 mbps (mega bytes per second).

LAN—local area network—a computer network that spans a relatively small area typically in a single building or group of buildings.

LCD—liquid crystal display—a type of display used in many portable computers. LCD displays utilize two sheets of polarizing material and has liquid crystal solution between them. An electric current passed through the liquid causes the crystals to align so that light cannot pass through them. Thus, each crystal operates like a shutter.

Movie—a media file viewed on screen in a player type environment and having controls that are operable to start, stop, and perform other variables of the file. The movies according to the present invention may have either static or motion images and may contain interactive elements or controls.

Object—a broad term including any item than can be individually selected and manipulated. In the context of this application it is referred to more specifically as a self-contained entity that consists of both data and procedures to manipulate the data.

OS—operating system—the most important program that runs on a computer. Operating systems perform basic tasks such as recognizing input from the keyboard and sending output to the display screen and printers. They are also responsible for controlling peripheral devices such as disk drives.

Router—a device that connects any number of LAN's and uses headers and a forwarding table to determine where packets and messages go and what is the best route to be taken.

SCSI—small computer system interface—SCSI is a parallel interface standard for attaching peripheral devices such as hard drives to computers.

SOAP—simple object access protocol—SOAP provides a way for applications to communicate with each other over the Internet independent of the specific platform of the computer systems.

SVGA—super video graphics array—a graphics display system for PC's providing high resolution and a color palette of up to 16 million colors. Typical SVGA monitors provide sufficient memory to display 256 colors simultaneously.

URL—uniform resource locator—the global address of documents and other resources on the World Wide Web.

VPN—virtual private network—a network that is constructed by using public wires to connect nodes. These systems use encryption and other security mechanisms to assure that only authorized users can access the network and that the data cannot be intercepted.

WAN—wide area network—a computer network that spans a relatively large geographic area. Typically a WAN consists of two or more LAN's and may be connected through the public switch telephone network.

What is claimed is:

1. A method for generating a dynamic user interface, the method comprising: transmitting local configuration information, including context information, from a local terminal to a server;
   determining, based on the context information, an overall user interface configuration;
   determining, based on the context information, applications for display in the overall user interface configuration; and
   transmitting the overall user interface configuration and applications for display in the overall user interface configuration to the local terminal;
   wherein the overall user interface configuration includes a plurality of screen application regions, and further comprising opening, in response to a user request, an application in a selected one of the plurality of screen application regions, generating a control movie operative to control the application, and playing the control movie in another selected one of the plurality of screen application regions.

2. The method according to claim 1 further comprising formatting data from the local configuration information into a request XML packet for transmission from the local terminal to the server, and formatting the overall user interface configuration and the applications for display in the overall user interface configuration into a return XML packet for transmission to the local terminal.

3. The method according to claim 1 further comprising retrieving local resources for display in the overall user interface configuration.

4. The method according to claim 1 wherein determining the overall user interface configuration comprises using a locally stored overall user interface configuration.

5. The method according to claim 1 further comprising retrieving Internet resources for display in the overall user interface configuration.

6. The method according to claim 1 further comprising updating the local configuration file.

7. The method according to claim 1 further comprising opening, in response to another user request, another application, generating another control movie operative to control the another application, and playing the another control movie.

8. The method according to claim 1 further comprising opening, in response to another user request, another application in the selected one of the plurality of screen application regions, generating another control movie operative to control the another application, and playing the another control movie in the another selected one of the plurality of screen application regions.

9. The method according to claim 8 further comprising displaying a tab for the application and displaying another tab for the another application.

* * * * *